United States Patent
Zhang et al.

(10) Patent No.: US 10,386,608 B2
(45) Date of Patent: Aug. 20, 2019

(54) OPTICAL IMAGING LENS

(71) Applicant: Genius Electronic Optical Co., Ltd., Taichung (TW)

(72) Inventors: Jiayuan Zhang, Fujian (CN); Hai Lin, Fujian (CN); Chuanbo Dong, Fujian (CN)

(73) Assignee: GENIUS ELECTRONIC OPTICAL (XIAMEN) CO., LTD., Xiamen, Fujian (CN)

( * ) Notice: Subject to any disclaimer, the term of this patent is extended or adjusted under 35 U.S.C. 154(b) by 3 days.

(21) Appl. No.: 15/643,487

(22) Filed: Jul. 7, 2017

(65) Prior Publication Data
US 2018/0348483 A1    Dec. 6, 2018

(30) Foreign Application Priority Data

Jun. 2, 2017   (CN) .......................... 2017 1 0408063

(51) Int. Cl.
| | |
|---|---|
| *G02B 13/18* | (2006.01) |
| *G02B 3/02* | (2006.01) |
| *G02B 13/00* | (2006.01) |
| *G02B 1/04* | (2006.01) |
| *G02B 9/62* | (2006.01) |

(52) U.S. Cl.
CPC ......... *G02B 13/0045* (2013.01); *G02B 1/041* (2013.01); *G02B 9/62* (2013.01)

(58) Field of Classification Search
CPC ...... G02B 13/0045; G02B 9/62; G02B 1/041; G02B 13/18; G02B 13/04; G02B 13/16; G02B 7/028
See application file for complete search history.

(56) References Cited

U.S. PATENT DOCUMENTS

| | | | | |
|---|---|---|---|---|
| 9,835,825 | B2* | 12/2017 | Kubota | .................... G02B 9/62 |
| 2016/0282585 | A1* | 9/2016 | Shih | .................... G02B 13/0045 |

* cited by examiner

*Primary Examiner* — Alicia M Harrington
(74) *Attorney, Agent, or Firm* — JCIPRNET

(57) ABSTRACT

An optical imaging lens includes a first lens element, a second lens element, a third lens element, a fourth lens element, a fifth lens element, and a sixth lens element from an object side to an image side in order along an optical axis. The first lens element to the sixth lens element each include an object-side surface and an image-side surface. The first and second lens elements are made of plastic material. The image-side surface of the third lens element has a concave portion in a vicinity of the optical axis. The fourth lens element has negative refracting power. The object-side surface of the fourth lens element has a concave portion in a vicinity of the optical axis. The object-side surface of the fifth lens element has a concave portion in a vicinity of the optical axis. The sixth lens element is made of plastic material.

20 Claims, 21 Drawing Sheets

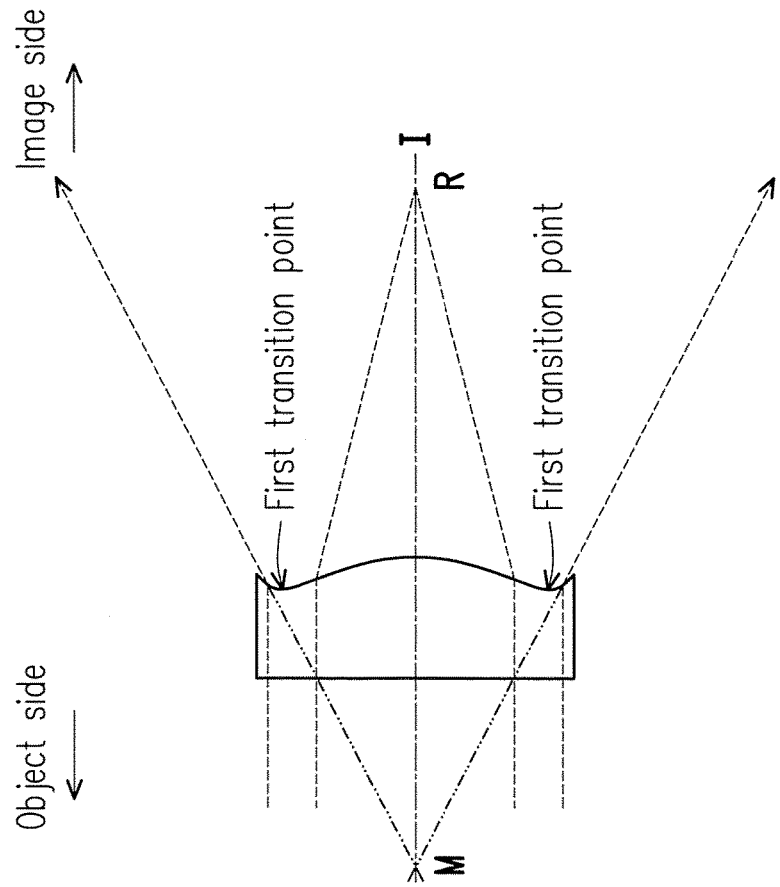
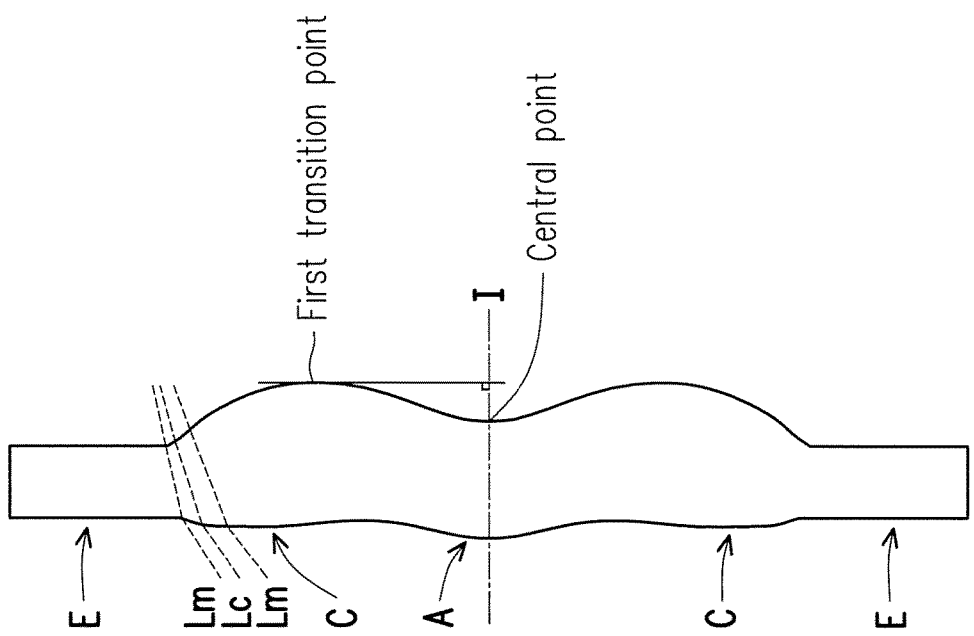
FIG. 2
FIG. 1

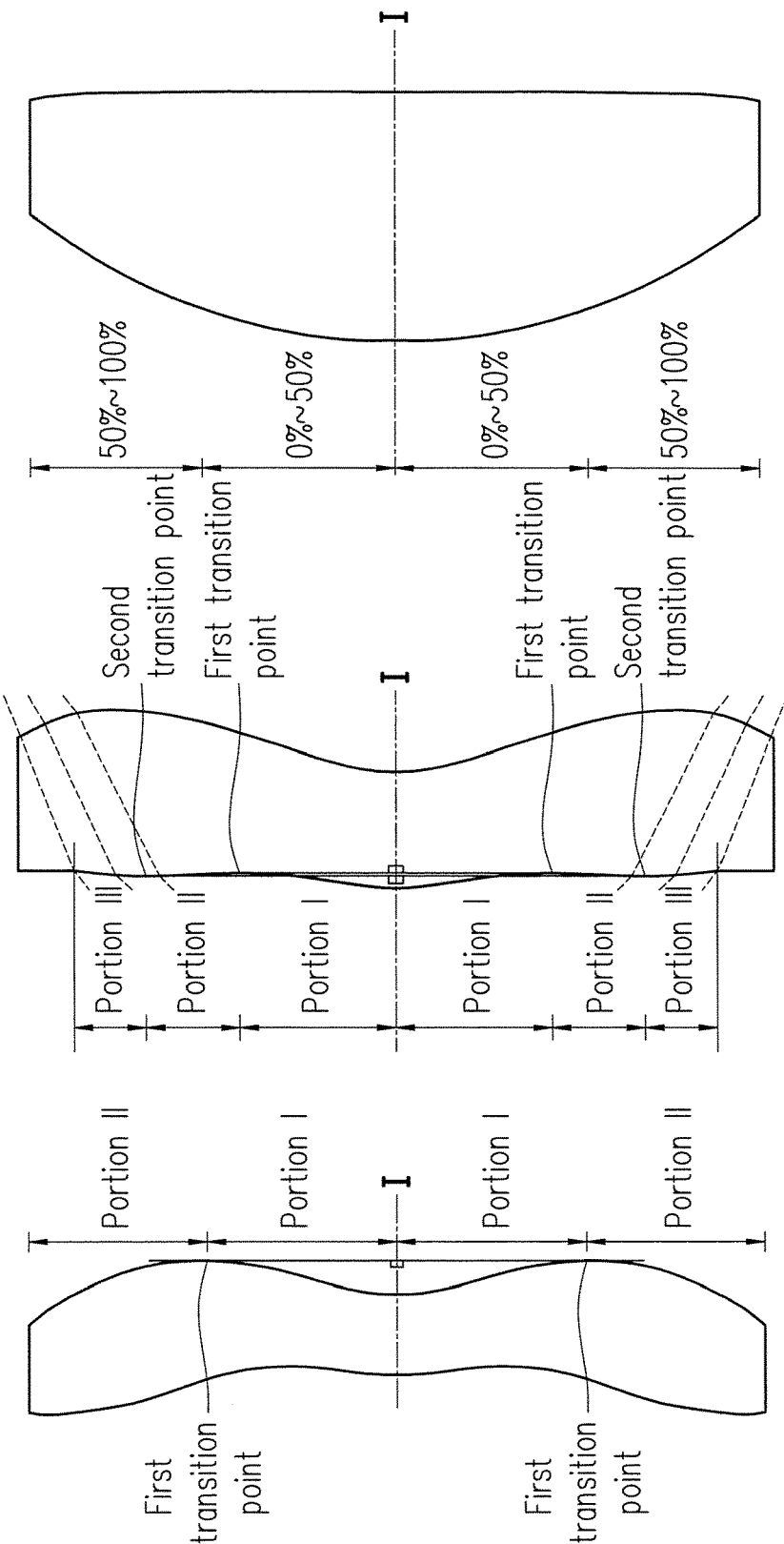

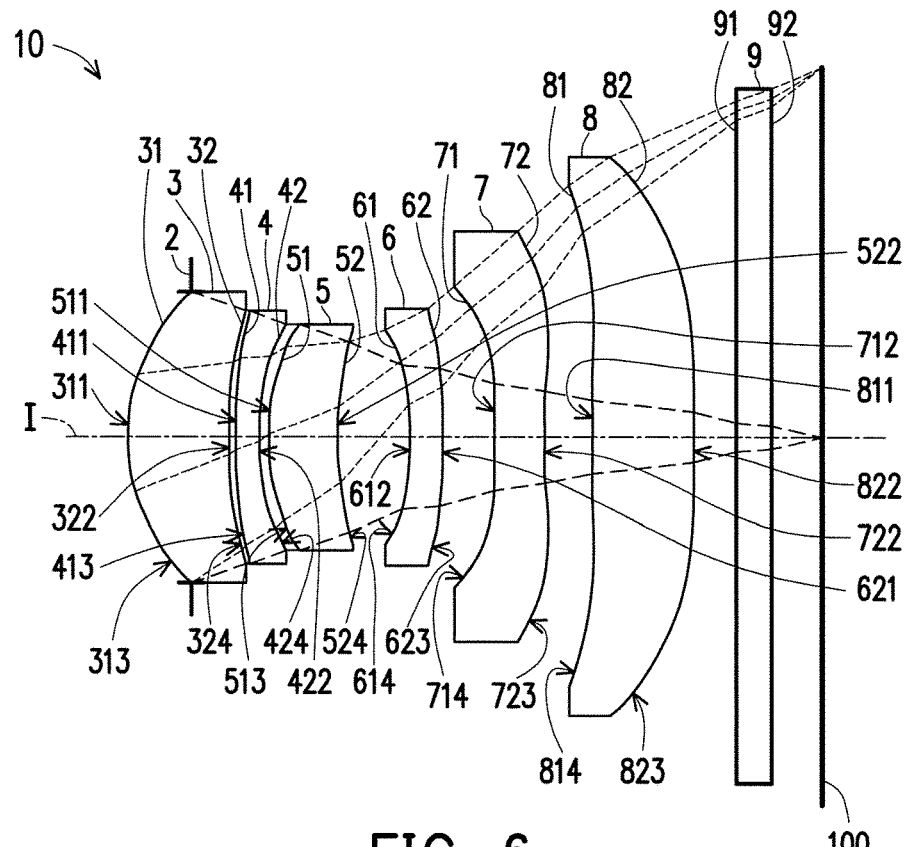
FIG. 6
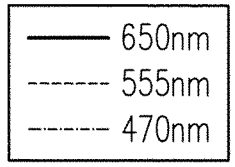
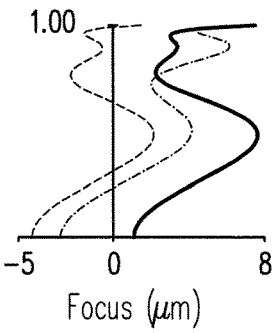
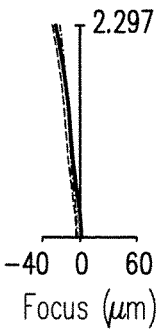
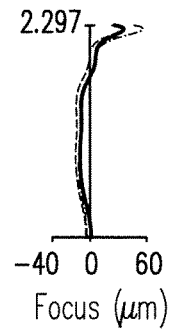
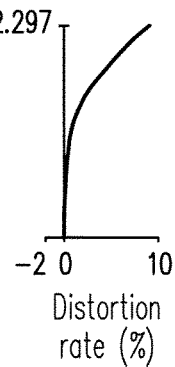
FIG. 7A　　FIG. 7B　　FIG. 7C　　FIG. 7D

| First embodiment ||||||
|---|---|---|---|---|---|
| EFL=4.752 mm, HFOV=24.239°, Fno=2.45, System length=4.615 mm, Image height=2.297 mm ||||||
| Lens element | Surface | Radius of curvature(mm) | Thickness (mm) | Refractive index | Abbe number | Focal length (mm) |
| Object | | Infinity | Infinity | | | |
| Aperture stop 2 | | Infinity | -0.411 | | | |
| First lens element 3 | Object-side surface 31 | 1.280 | 0.665 | 1.545 | 55.987 | 3.448 |
| | Image-side surface 32 | 3.263 | 0.048 | | | |
| Second lens element 4 | Object-side surface 41 | 4.299 | 0.157 | 1.642 | 22.409 | -5.225 |
| | Image-side surface 42 | 1.866 | 0.059 | | | |
| Third lens element 5 | Object-side surface 51 | 1.437 | 0.469 | 1.545 | 55.987 | 4.837 |
| | Image-side surface 52 | 2.786 | 0.482 | | | |
| Fourth lens element 6 | Object-side surface 61 | -2.717 | 0.218 | 1.661 | 20.368 | -9.205 |
| | Image-side surface 62 | -5.032 | 0.346 | | | |
| Fifth lens element 7 | Object-side surface 71 | -18.347 | 0.321 | 1.545 | 55.987 | -5.054 |
| | Image-side surface 72 | 3.270 | 0.318 | | | |
| Sixth lens element 8 | Object-side surface 81 | 8.584 | 0.683 | 1.661 | 20.368 | 13.195 |
| | Image-side surface 82 | 338.337 | 0.300 | | | |
| Filter 9 | Object-side surface 91 | Infinity | 0.210 | 1.517 | 64.167 | |
| | Image-side surface 92 | Infinity | 0.338 | | | |
| | Image plane 100 | Infinity | | | | |

FIG. 8

| Surface | K | $a_4$ | $a_6$ | $a_8$ | $a_{10}$ |
|---|---|---|---|---|---|
| 31 | 0.000000E+00 | -9.423988E-03 | 1.067565E-03 | -2.700506E-03 | -2.352112E-03 |
| 32 | 0.000000E+00 | -1.105159E-02 | 4.894814E-03 | 1.264184E-02 | 5.231691E-03 |
| 41 | 0.000000E+00 | 1.591548E-02 | -1.992940E-03 | 3.261651E-02 | 3.546911E-02 |
| 42 | 0.000000E+00 | 5.477647E-03 | 2.228140E-02 | 7.017016E-02 | 1.141939E-01 |
| 51 | 0.000000E+00 | -4.119211E-02 | 1.635614E-02 | 4.788502E-02 | 9.559198E-02 |
| 52 | 0.000000E+00 | 1.285942E-02 | -6.370844E-03 | -6.802098E-02 | -9.990938E-02 |
| 61 | 0.000000E+00 | -1.370919E-01 | -3.073481E-01 | 2.788607E-01 | -5.832350E-01 |
| 62 | 0.000000E+00 | -6.120353E-02 | -1.350092E-01 | 1.126451E-01 | 1.269545E-01 |
| 71 | -9.856115E+02 | -3.002767E-01 | -3.393620E-02 | 2.435710E-03 | -3.703508E-02 |
| 72 | 0.000000E+00 | -2.802481E-01 | 8.930578E-02 | -4.377741E-02 | 2.827391E-02 |
| 81 | 0.000000E+00 | -7.608147E-02 | 2.182710E-02 | -6.800015E-03 | 1.190008E-03 |
| 82 | 3.162238E+04 | -8.757316E-02 | 1.755855E-02 | -6.415037E-04 | -4.191765E-04 |
| Surface | $a_{12}$ | $a_{14}$ | $a_{16}$ | $a_{18}$ | $a_{20}$ |
| 31 | -1.597922E-03 | -2.377830E-03 | 7.028491E-04 | | |
| 32 | 7.611290E-03 | 9.468370E-03 | -8.398059E-03 | | |
| 41 | 1.069892E-02 | -2.414621E-02 | -8.207968E-03 | | |
| 42 | 7.342513E-02 | -2.123992E-02 | -2.096536E-01 | | |
| 51 | 4.595616E-02 | -2.466250E-02 | -6.498556E-02 | | |
| 52 | 2.143923E-01 | 4.110093E-01 | -6.108210E-01 | | |
| 61 | 2.922489E-01 | 1.302448E+00 | -2.376992E+00 | | |
| 62 | 6.894566E-02 | -5.740440E-02 | -5.787914E-02 | | |
| 71 | 8.060980E-02 | 1.603333E-01 | -1.305239E-01 | -3.808652E-03 | -4.069633E-03 |
| 72 | -2.254349E-03 | -1.613519E-03 | -5.367861E-04 | 1.458682E-05 | 3.631638E-06 |
| 81 | 7.329269E-04 | -3.869003E-04 | 4.949326E-05 | -1.549399E-07 | -7.824340E-08 |
| 82 | -5.408443E-05 | 2.475121E-05 | -1.428900E-06 | 1.121849E-07 | -4.072291E-08 |
| Surface | $R_N$ | | | | |
| 31 | 1.000000E+00 | | | | |
| 32 | 1.000000E+00 | | | | |
| 41 | 1.000000E+00 | | | | |
| 42 | 1.000000E+00 | | | | |
| 51 | 1.000000E+00 | | | | |
| 52 | 1.000000E+00 | | | | |
| 61 | 1.000000E+00 | | | | |
| 62 | 1.000000E+00 | | | | |
| 71 | 1.022122E+00 | | | | |
| 72 | 1.055384E+00 | | | | |
| 81 | 1.000226E+00 | | | | |
| 82 | 1.012777E+00 | | | | |

FIG. 9

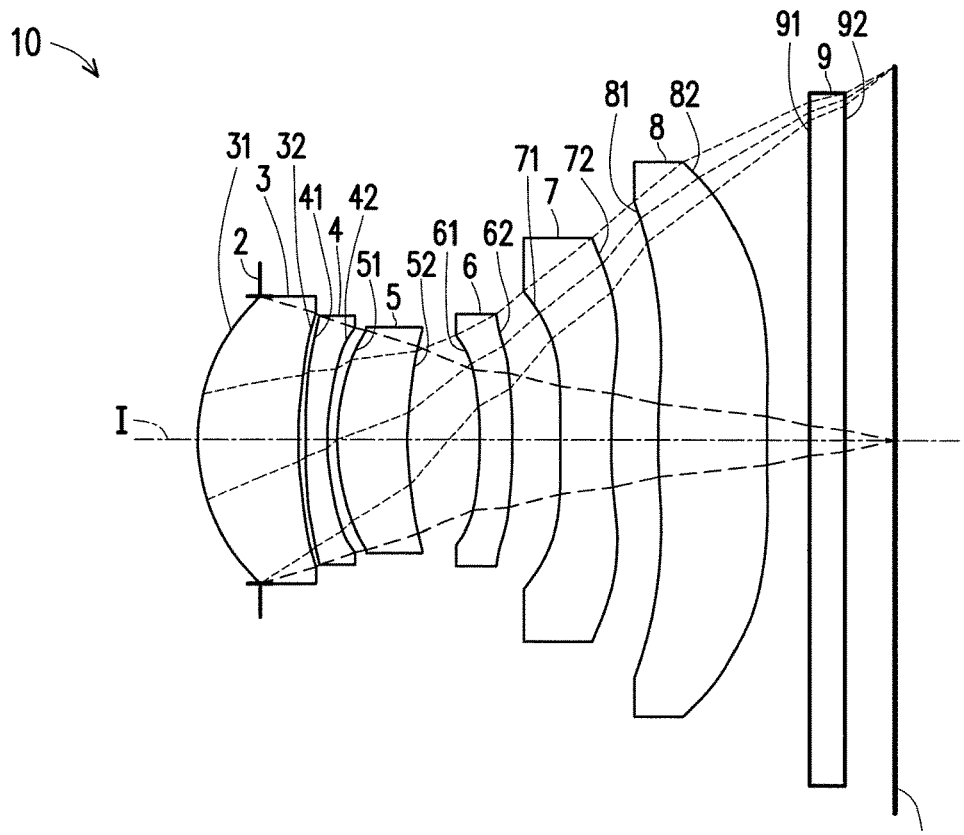
FIG. 10
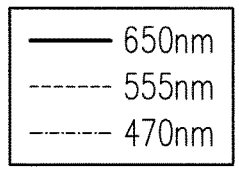
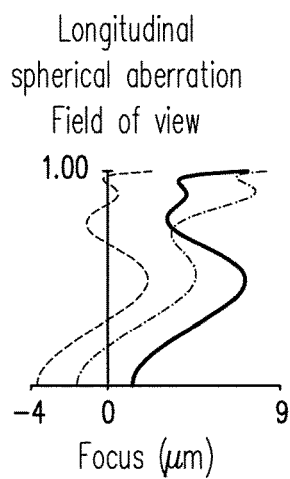
Longitudinal spherical aberration
Field of view
FIG. 11A
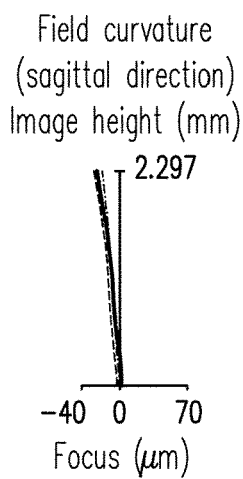
Field curvature (sagittal direction)
Image height (mm)
FIG. 11B
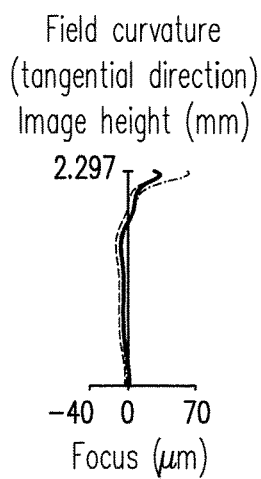
Field curvature (tangential direction)
Image height (mm)
FIG. 11C
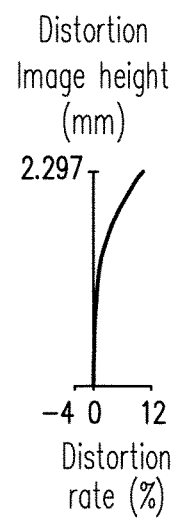
Distortion
Image height (mm)
FIG. 11D

| Second embodiment ||||||
|---|---|---|---|---|---|
| EFL=4.707 mm, HFOV=24.312°, Fno=2.45, System length=4.624 mm, Image height=2.297 mm ||||||
| Lens element | Surface | Radius of curvature(mm) | Thickness (mm) | Refractive index | Abbe number | Focal length (mm) |
| Object | | Infinity | Infinity | | | |
| Aperture stop 2 | | Infinity | -0.403 | | | |
| First lens element 3 | Object-side surface 31 | 1.279 | 0.669 | 1.545 | 55.987 | 3.443 |
| | Image-side surface 32 | 3.263 | 0.044 | | | |
| Second lens element 4 | Object-side surface 41 | 4.253 | 0.149 | 1.642 | 22.409 | -5.223 |
| | Image-side surface 42 | 1.858 | 0.062 | | | |
| Third lens element 5 | Object-side surface 51 | 1.445 | 0.469 | 1.545 | 55.987 | 4.843 |
| | Image-side surface 52 | 2.820 | 0.479 | | | |
| Fourth lens element 6 | Object-side surface 61 | -2.597 | 0.210 | 1.661 | 20.368 | -9.272 |
| | Image-side surface 62 | -4.623 | 0.323 | | | |
| Fifth lens element 7 | Object-side surface 71 | -33.700 | 0.339 | 1.545 | 55.987 | -5.312 |
| | Image-side surface 72 | 3.186 | 0.310 | | | |
| Sixth lens element 8 | Object-side surface 81 | 8.830 | 0.722 | 1.661 | 20.368 | 13.586 |
| | Image-side surface 82 | 334.736 | 0.300 | | | |
| Filter 9 | Object-side surface 91 | Infinity | 0.210 | 1.517 | 64.167 | |
| | Image-side surface 92 | Infinity | 0.338 | | | |
| | Image plane 100 | Infinity | | | | |

FIG. 12

| Surface | K | $a_4$ | $a_6$ | $a_8$ | $a_{10}$ |
|---|---|---|---|---|---|
| 31 | 0.000000E+00 | -8.527823E-03 | 1.099332E-03 | -2.622165E-03 | -2.167885E-03 |
| 32 | 0.000000E+00 | -1.139266E-02 | 4.389314E-03 | 1.226788E-02 | 5.309586E-03 |
| 41 | 0.000000E+00 | 1.598108E-02 | -1.851483E-03 | 3.254552E-02 | 3.491418E-02 |
| 42 | 0.000000E+00 | 5.951037E-03 | 2.255359E-02 | 6.975626E-02 | 1.129737E-01 |
| 51 | 0.000000E+00 | -4.220219E-02 | 1.479462E-02 | 4.659341E-02 | 9.456477E-02 |
| 52 | 0.000000E+00 | 1.407945E-02 | -5.969999E-03 | -6.717943E-02 | -9.903452E-02 |
| 61 | 0.000000E+00 | -1.341512E-01 | -2.994446E-01 | 2.795565E-01 | -5.891358E-01 |
| 62 | 0.000000E+00 | -6.589280E-02 | -1.381645E-01 | 1.125467E-01 | 1.275780E-01 |
| 71 | -5.412222E+03 | -2.965444E-01 | -3.193470E-02 | 4.467972E-03 | -3.633596E-02 |
| 72 | 0.000000E+00 | -2.784776E-01 | 9.164557E-02 | -4.402079E-02 | 2.806249E-02 |
| 81 | 0.000000E+00 | -7.702325E-02 | 2.128315E-02 | -6.817941E-03 | 1.203483E-03 |
| 82 | 3.176488E+04 | -9.113120E-02 | 1.712783E-02 | -5.311558E-04 | -4.201832E-04 |
| Surface | $a_{12}$ | $a_{14}$ | $a_{16}$ | $a_{18}$ | $a_{20}$ |
| 31 | -1.400548E-03 | -2.224018E-03 | 8.022590E-04 | | |
| 32 | 8.154027E-03 | 1.006454E-02 | -8.680193E-03 | | |
| 41 | 9.661491E-03 | -2.527466E-02 | -8.533000E-03 | | |
| 42 | 7.127886E-02 | -2.490604E-02 | -2.165148E-01 | | |
| 51 | 4.467720E-02 | -2.655678E-02 | -6.687078E-02 | | |
| 52 | 2.149081E-01 | 4.108957E-01 | -6.139604E-01 | | |
| 61 | 2.887187E-01 | 1.320549E+00 | -2.298624E+00 | | |
| 62 | 6.948880E-02 | -5.721754E-02 | -5.822653E-02 | | |
| 71 | 8.013566E-02 | 1.594074E-01 | -1.314085E-01 | -4.490457E-03 | -4.606097E-03 |
| 72 | -2.299734E-03 | -1.611229E-03 | -5.298316E-04 | 1.986765E-05 | 8.105649E-06 |
| 81 | 7.360040E-04 | -3.868036E-04 | 4.926781E-05 | -3.003392E-07 | -1.503323E-07 |
| 82 | -5.805671E-05 | 2.369973E-05 | -1.630618E-06 | 7.609295E-08 | -4.813148E-08 |

| Surface | $R_N$ |
|---|---|
| 31 | 1.000000E+00 |
| 32 | 1.000000E+00 |
| 41 | 1.000000E+00 |
| 42 | 1.000000E+00 |
| 51 | 1.000000E+00 |
| 52 | 1.000000E+00 |
| 61 | 1.000000E+00 |
| 62 | 1.000000E+00 |
| 71 | 1.027924E+00 |
| 72 | 1.060379E+00 |
| 81 | 9.853772E-01 |
| 82 | 1.029314E+00 |

FIG. 13

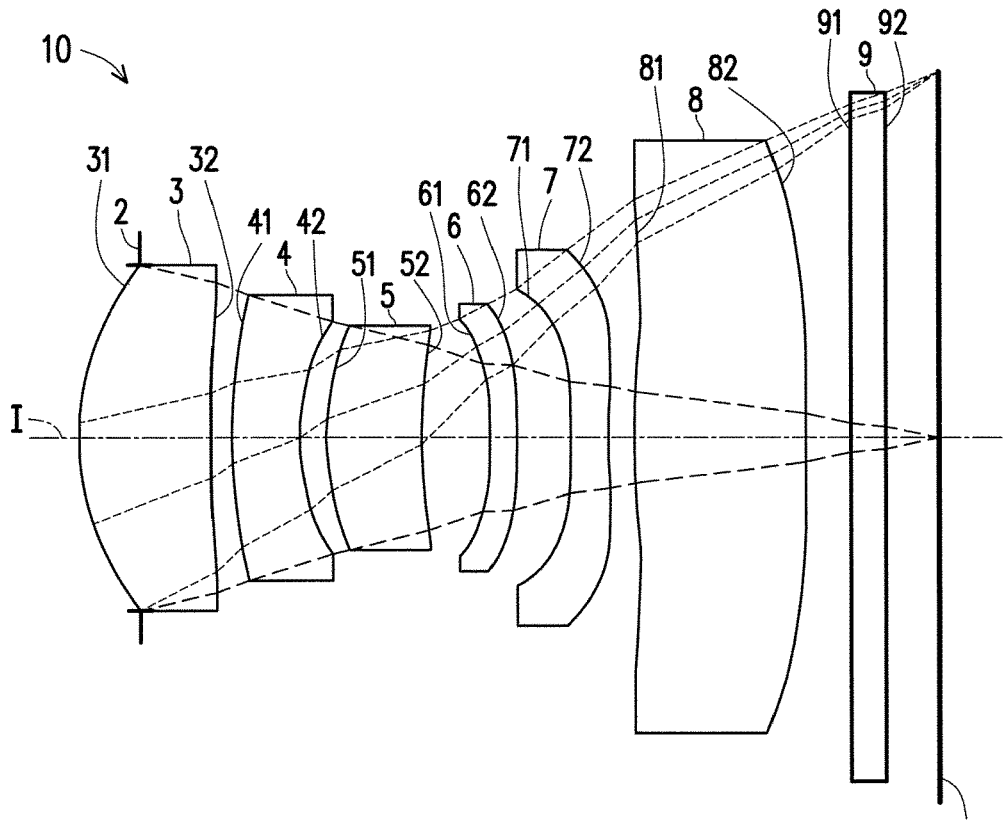
FIG. 14
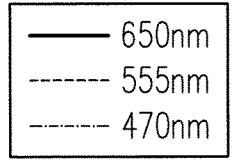
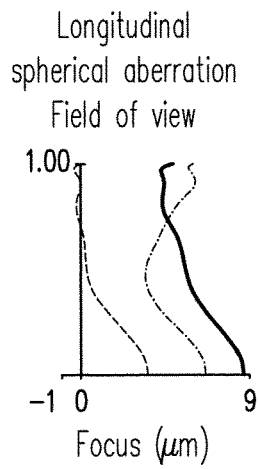
Longitudinal
spherical aberration
Field of view
FIG. 15A
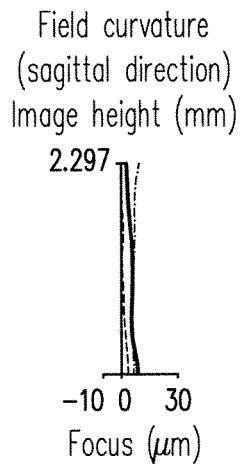
Field curvature
(sagittal direction)
Image height (mm)
FIG. 15B
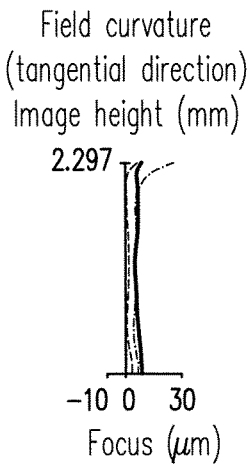
Field curvature
(tangential direction)
Image height (mm)
FIG. 15C
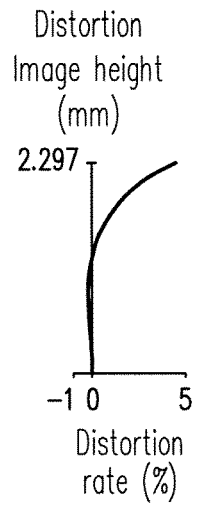
Distortion
Image height
(mm)
FIG. 15D

| Third embodiment | | | | | | |
|---|---|---|---|---|---|---|
| EFL=5.460 mm, HFOV=22.111°, Fno=2.45, System length=5.503 mm, Image height=2.297 mm | | | | | | |
| Lens element | Surface | Radius of curvature(mm) | Thickness (mm) | Refractive index | Abbe number | Focal length (mm) |
| Object | | Infinity | Infinity | | | |
| Aperture stop 2 | | Infinity | -0.379 | | | |
| First lens element 3 | Object-side surface 31 | 1.659 | 0.844 | 1.545 | 55.987 | 3.515 |
| | Image-side surface 32 | 10.014 | 0.136 | | | |
| Second lens element 4 | Object-side surface 41 | 3.908 | 0.435 | 1.642 | 22.409 | -4.245 |
| | Image-side surface 42 | 1.543 | 0.174 | | | |
| Third lens element 5 | Object-side surface 51 | 1.818 | 0.610 | 1.545 | 55.987 | 6.238 |
| | Image-side surface 52 | 3.436 | 0.439 | | | |
| Fourth lens element 6 | Object-side surface 61 | -2.867 | 0.170 | 1.661 | 20.368 | -15.573 |
| | Image-side surface 62 | -4.054 | 0.335 | | | |
| Fifth lens element 7 | Object-side surface 71 | -105.080 | 0.246 | 1.545 | 55.987 | -5.923 |
| | Image-side surface 72 | 3.341 | 0.185 | | | |
| Sixth lens element 8 | Object-side surface 81 | 8.800 | 1.082 | 1.661 | 20.368 | 14.327 |
| | Image-side surface 82 | 105.808 | 0.300 | | | |
| Filter 9 | Object-side surface 91 | Infinity | 0.210 | 1.517 | 64.167 | |
| | Image-side surface 92 | Infinity | 0.337 | | | |
| | Image plane 100 | Infinity | | | | |

FIG. 16

| Surface | K | $a_4$ | $a_6$ | $a_8$ | $a_{10}$ |
|---|---|---|---|---|---|
| 31 | 0.000000E+00 | -9.054475E-03 | -4.380312E-03 | -3.010432E-03 | -1.324838E-04 |
| 32 | 0.000000E+00 | -6.433169E-03 | -1.401873E-02 | 8.634876E-03 | 3.148542E-03 |
| 41 | 0.000000E+00 | -1.763270E-03 | -1.539874E-03 | 1.696841E-02 | 4.273300E-03 |
| 42 | 0.000000E+00 | -1.560544E-02 | 6.178018E-02 | 1.561062E-03 | 6.847971E-02 |
| 51 | 0.000000E+00 | -4.379628E-02 | 4.131298E-02 | 1.808442E-03 | 5.131373E-02 |
| 52 | 0.000000E+00 | -6.392844E-02 | -4.384741E-02 | -8.997984E-03 | -1.348155E-02 |
| 61 | 0.000000E+00 | -1.822605E-01 | -1.812442E-01 | 1.524581E-01 | -3.036272E-01 |
| 62 | 0.000000E+00 | -1.533492E-01 | -8.389504E-02 | 1.051431E-01 | -1.050448E-01 |
| 71 | 9.708714E+03 | -4.524018E-01 | 9.748902E-02 | -3.757964E-02 | -1.352643E-01 |
| 72 | 0.000000E+00 | -2.454723E-01 | 1.081959E-01 | -5.878604E-02 | 1.961872E-02 |
| 81 | 0.000000E+00 | -5.691218E-02 | 2.388324E-02 | -8.221393E-03 | 1.182040E-03 |
| 82 | -4.896477E+04 | -4.080778E-02 | 1.460812E-02 | -2.982064E-03 | 4.152672E-05 |
| Surface | $a_{12}$ | $a_{14}$ | $a_{16}$ | $a_{18}$ | $a_{20}$ |
| 31 | 3.750443E-04 | -9.055937E-04 | 3.389738E-04 | | |
| 32 | -6.129687E-04 | -4.321027E-03 | 2.456992E-03 | | |
| 41 | -5.419721E-03 | -3.735872E-03 | 3.874117E-03 | | |
| 42 | 1.335569E-02 | -1.118545E-01 | 1.042424E-01 | | |
| 51 | 1.812230E-02 | -7.956596E-02 | 7.397062E-02 | | |
| 52 | 5.957536E-03 | -2.545508E-02 | 3.006059E-02 | | |
| 61 | 9.114644E-02 | 3.138795E-01 | -2.189182E-01 | | |
| 62 | 1.346550E-02 | 1.357651E-01 | -8.869304E-02 | | |
| 71 | 9.892314E-03 | 9.098672E-02 | -1.182099E-01 | 7.473130E-02 | -2.988191E-02 |
| 72 | -2.519735E-03 | -5.540059E-04 | 1.517115E-04 | 2.984237E-04 | -9.691565E-05 |
| 81 | 7.511129E-04 | -3.793645E-04 | 5.059144E-05 | 2.116903E-07 | -1.613851E-07 |
| 82 | 1.300322E-05 | 2.241640E-05 | -4.089101E-06 | -1.749241E-07 | 5.309465E-08 |
| Surface | $R_N$ | | | | |
| 31 | 1.000000E+00 | | | | |
| 32 | 1.000000E+00 | | | | |
| 41 | 1.000000E+00 | | | | |
| 42 | 1.000000E+00 | | | | |
| 51 | 1.000000E+00 | | | | |
| 52 | 1.000000E+00 | | | | |
| 61 | 1.000000E+00 | | | | |
| 62 | 1.000000E+00 | | | | |
| 71 | 1.031644E+00 | | | | |
| 72 | 9.011415E-01 | | | | |
| 81 | 9.915407E-01 | | | | |
| 82 | 9.624217E-01 | | | | |

FIG. 17

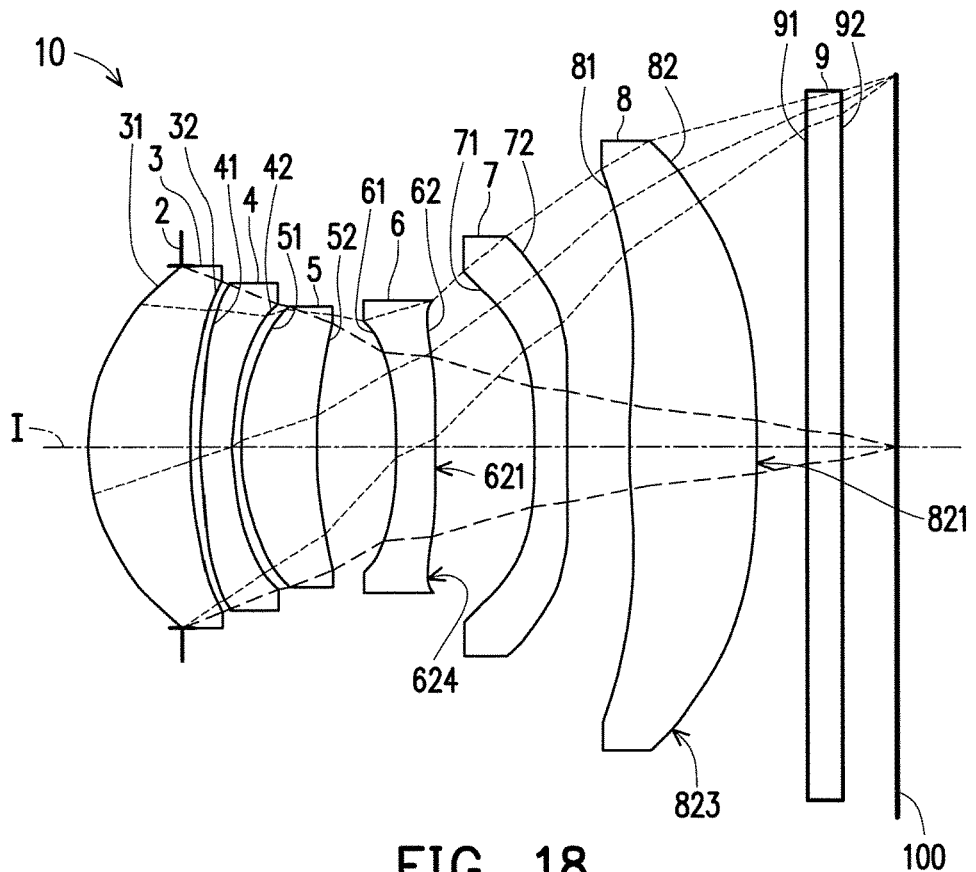
FIG. 18
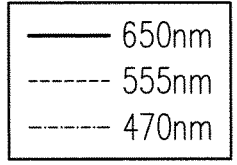
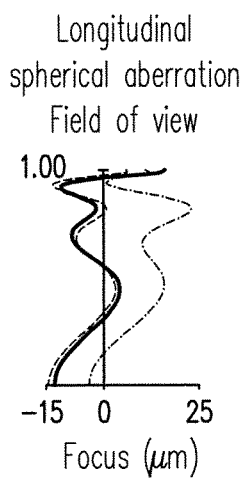
Longitudinal
spherical aberration
Field of view
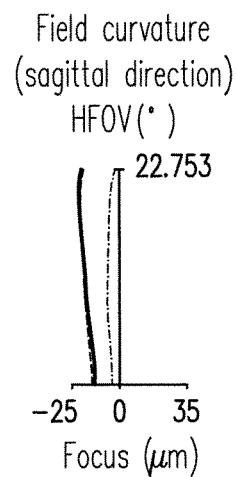
Field curvature
(sagittal direction)
HFOV(°)
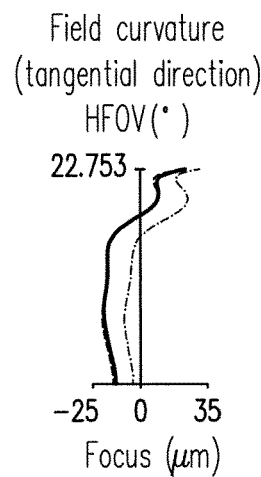
Field curvature
(tangential direction)
HFOV(°)
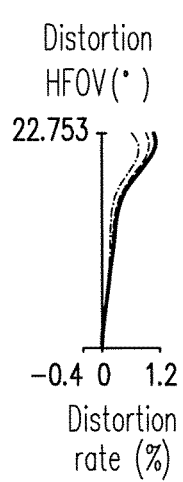
Distortion
HFOV(°)
FIG. 19A    FIG. 19B    FIG. 19C    FIG. 19D

| Fourth embodiment ||||||
|---|---|---|---|---|---|
| EFL=5.404 mm, HFOV=22.752°, Fno=2.45, System length=4.898 mm, Image height=2.297 mm ||||||
| Lens element | Surface | Radius of curvature(mm) | Thickness (mm) | Refractive index | Abbe number | Focal length (mm) |
| Object | | Infinity | Infinity | | | |
| Aperture stop 2 | | Infinity | -0.567 | | | |
| First lens element 3 | Object-side surface 31 | 1.285 | 0.621 | 1.545 | 55.987 | 3.516 |
| | Image-side surface 32 | 3.221 | 0.065 | | | |
| Second lens element 4 | Object-side surface 41 | 4.523 | 0.187 | 1.642 | 22.409 | -5.093 |
| | Image-side surface 42 | 1.876 | 0.053 | | | |
| Third lens element 5 | Object-side surface 51 | 1.486 | 0.458 | 1.545 | 55.987 | 5.055 |
| | Image-side surface 52 | 2.869 | 0.482 | | | |
| Fourth lens element 6 | Object-side surface 61 | -3.105 | 0.239 | 1.661 | 20.368 | -9.137 |
| | Image-side surface 62 | -6.524 | 0.593 | | | |
| Fifth lens element 7 | Object-side surface 71 | -7.330 | 0.198 | 1.545 | 55.987 | -5.913 |
| | Image-side surface 72 | 5.830 | 0.488 | | | |
| Sixth lens element 8 | Object-side surface 81 | -14.213 | 0.664 | 1.661 | 20.368 | 26.712 |
| | Image-side surface 82 | -8.054 | 0.300 | | | |
| Filter 9 | Object-side surface 91 | Infinity | 0.210 | 1.517 | 64.167 | |
| | Image-side surface 92 | Infinity | 0.338 | | | |
| | Image plane 100 | Infinity | | | | |

FIG. 20

| Surface | K | $a_4$ | $a_6$ | $a_8$ | $a_{10}$ |
|---|---|---|---|---|---|
| 31 | 0.000000E+00 | -1.367153E-02 | 1.508846E-03 | -2.527963E-03 | -2.734333E-03 |
| 32 | 0.000000E+00 | -8.998684E-03 | 6.748231E-03 | 1.442543E-02 | 5.969617E-03 |
| 41 | 0.000000E+00 | 1.634210E-02 | -2.278723E-03 | 3.216564E-02 | 3.591907E-02 |
| 42 | 0.000000E+00 | 1.062872E-03 | 1.942633E-02 | 7.156824E-02 | 1.216294E-01 |
| 51 | 0.000000E+00 | -4.023748E-02 | 1.945003E-02 | 4.972957E-02 | 9.443323E-02 |
| 52 | 0.000000E+00 | -1.369776E-03 | -2.046790E-02 | -9.164575E-02 | -1.225936E-01 |
| 61 | 0.000000E+00 | -1.262755E-01 | -3.146800E-01 | 2.881797E-01 | -5.305437E-01 |
| 62 | 0.000000E+00 | -3.123264E-02 | -1.097425E-01 | 1.245119E-01 | 1.348992E-01 |
| 71 | 1.189770E+01 | -3.597870E-01 | -5.268830E-02 | -3.832566E-03 | -4.003882E-02 |
| 72 | 0.000000E+00 | -2.891768E-01 | 7.648545E-02 | -4.494109E-02 | 2.936062E-02 |
| 81 | 0.000000E+00 | -6.425947E-02 | 2.321036E-02 | -6.731240E-03 | 1.178220E-03 |
| 82 | -2.222576E+00 | -8.298435E-02 | 1.685333E-02 | -8.992971E-04 | -4.356658E-04 |
| Surface | $a_{12}$ | $a_{14}$ | $a_{16}$ | $a_{18}$ | $a_{20}$ |
| 31 | -2.094529E-03 | -2.739004E-03 | 4.959619E-04 | | |
| 32 | 7.008624E-03 | 8.156070E-03 | -9.057015E-03 | | |
| 41 | 1.239976E-02 | -2.165523E-02 | -5.948564E-03 | | |
| 42 | 8.747303E-02 | -2.078770E-03 | -1.922028E-01 | | |
| 51 | 4.379204E-02 | -1.921939E-02 | -2.994087E-02 | | |
| 52 | 2.121829E-01 | 4.440919E-01 | -5.663699E-01 | | |
| 61 | 3.831513E-01 | 1.357863E+00 | -2.557668E+00 | | |
| 62 | 7.400089E-02 | -5.977069E-02 | -7.637740E-02 | | |
| 71 | 8.272706E-02 | 1.654709E-01 | -1.244049E-01 | 2.732391E-03 | 2.038705E-03 |
| 72 | -1.789023E-03 | -1.496181E-03 | -5.204011E-04 | 4.812522E-06 | -2.363777E-05 |
| 81 | 7.299792E-04 | -3.869504E-04 | 4.972661E-05 | -2.270838E-09 | 1.963421E-09 |
| 82 | -4.899209E-05 | 2.716903E-05 | -7.087368E-07 | 2.767279E-07 | -3.889640E-09 |
| Surface | $R_N$ | | | | |
| 31 | 1.000000E+00 | | | | |
| 32 | 1.000000E+00 | | | | |
| 41 | 1.000000E+00 | | | | |
| 42 | 1.000000E+00 | | | | |
| 51 | 1.000000E+00 | | | | |
| 52 | 1.000000E+00 | | | | |
| 61 | 1.000000E+00 | | | | |
| 62 | 1.000000E+00 | | | | |
| 71 | 1.045249E+00 | | | | |
| 72 | 1.004999E+00 | | | | |
| 81 | 1.052128E+00 | | | | |
| 82 | 1.075360E+00 | | | | |

FIG. 21

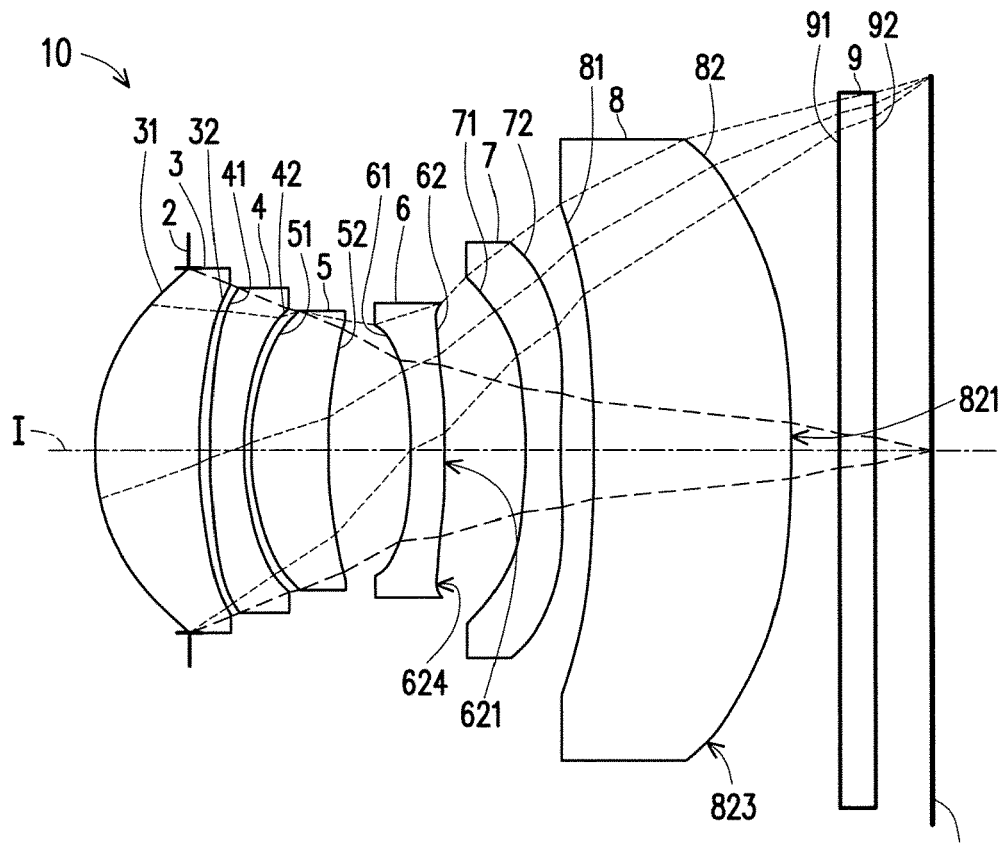
FIG. 22
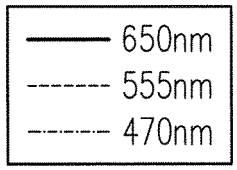
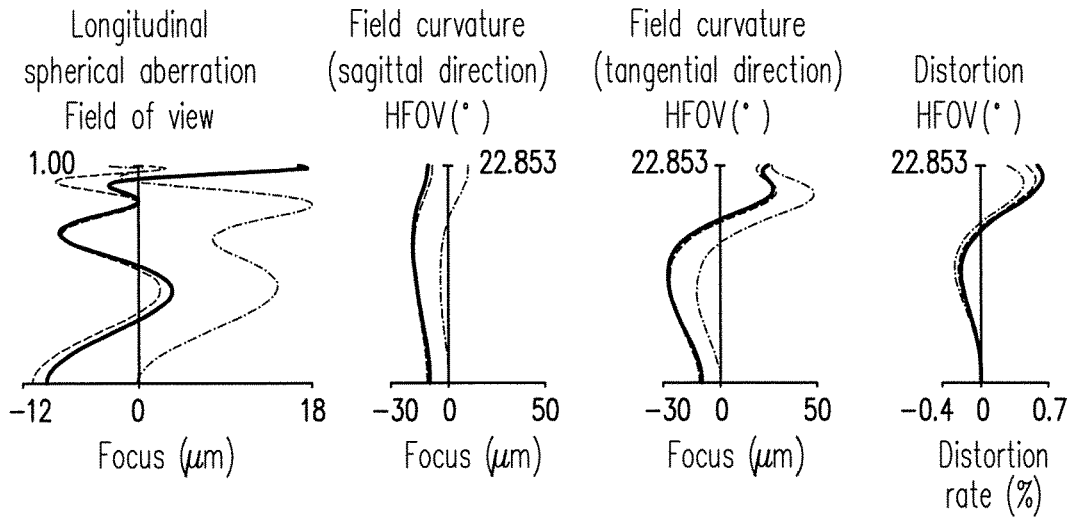
FIG. 23A   FIG. 23B   FIG. 23C   FIG. 23D

| Fifth embodiment | | | | | | |
|---|---|---|---|---|---|---|
| EFL=5.407 mm, HFOV=22.851°, Fno=2.45, System length=5.041 mm, Image height=2.297 mm | | | | | | |
| Lens element | Surface | Radius of curvature(mm) | Thickness (mm) | Refractive index | Abbe number | Focal length (mm) |
| Object | | Infinity | Infinity | | | |
| Aperture stop 2 | | Infinity | -0.567 | | | |
| First lens element 3 | Object-side surface 31 | 1.285 | 0.631 | 1.545 | 55.987 | 3.495 |
| | Image-side surface 32 | 3.245 | 0.066 | | | |
| Second lens element 4 | Object-side surface 41 | 4.325 | 0.200 | 1.642 | 22.409 | -5.221 |
| | Image-side surface 42 | 1.863 | 0.044 | | | |
| Third lens element 5 | Object-side surface 51 | 1.450 | 0.465 | 1.545 | 55.987 | 4.934 |
| | Image-side surface 52 | 2.783 | 0.502 | | | |
| Fourth lens element 6 | Object-side surface 61 | -3.079 | 0.199 | 1.661 | 20.368 | -7.681 |
| | Image-side surface 62 | -7.917 | 0.483 | | | |
| Fifth lens element 7 | Object-side surface 71 | -6.954 | 0.212 | 1.545 | 55.987 | -5.351 |
| | Image-side surface 72 | 5.097 | 0.201 | | | |
| Sixth lens element 8 | Object-side surface 81 | -18.944 | 1.189 | 1.661 | 20.368 | 18.111 |
| | Image-side surface 82 | -7.561 | 0.300 | | | |
| Filter 9 | Object-side surface 91 | Infinity | 0.210 | 1.517 | 64.167 | |
| | Image-side surface 92 | Infinity | 0.338 | | | |
| | Image plane 100 | Infinity | | | | |

FIG. 24

| Surface | K | $a_4$ | $a_6$ | $a_8$ | $a_{10}$ |
|---|---|---|---|---|---|
| 31 | 0.000000E+00 | -1.283555E-02 | 1.176196E-03 | -2.624720E-03 | -2.713634E-03 |
| 32 | 0.000000E+00 | -1.017727E-02 | 6.493334E-03 | 1.413300E-02 | 5.614952E-03 |
| 41 | 0.000000E+00 | 1.636632E-02 | -2.863716E-03 | 3.195614E-02 | 3.581647E-02 |
| 42 | 0.000000E+00 | 3.230073E-03 | 2.172101E-02 | 7.225644E-02 | 1.214196E-01 |
| 51 | 0.000000E+00 | -3.877848E-02 | 1.935791E-02 | 4.999047E-02 | 9.416614E-02 |
| 52 | 0.000000E+00 | 5.926713E-03 | -1.412836E-02 | -8.956531E-02 | -1.250662E-01 |
| 61 | 0.000000E+00 | -1.442068E-01 | -3.287169E-01 | 2.674778E-01 | -5.724706E-01 |
| 62 | 0.000000E+00 | -3.496790E-02 | -1.140148E-01 | 1.230591E-01 | 1.323248E-01 |
| 71 | -4.732715E+00 | -3.105519E-01 | -4.002096E-02 | -1.908827E-03 | -3.828984E-02 |
| 72 | 0.000000E+00 | -2.978595E-01 | 7.444766E-02 | -4.535859E-02 | 2.872267E-02 |
| 81 | 0.000000E+00 | -6.553284E-02 | 2.318812E-02 | -6.746374E-03 | 1.175738E-03 |
| 82 | -2.253931E+01 | -7.303475E-02 | 1.612488E-02 | -1.049838E-03 | -4.629623E-04 |
| Surface | $a_{12}$ | $a_{14}$ | $a_{16}$ | $a_{18}$ | $a_{20}$ |
| 31 | -2.007579E-03 | -2.603114E-03 | 6.678836E-04 | | |
| 32 | 6.796930E-03 | 7.969383E-03 | -9.322990E-03 | | |
| 41 | 1.224633E-02 | -2.180265E-02 | -5.953533E-03 | | |
| 42 | 8.704431E-02 | -2.678884E-03 | -1.934786E-01 | | |
| 51 | 4.138216E-02 | -2.383121E-02 | -3.720062E-02 | | |
| 52 | 2.050237E-01 | 4.352329E-01 | -5.740828E-01 | | |
| 61 | 3.281016E-01 | 1.334738E+00 | -2.491174E+00 | | |
| 62 | 7.173009E-02 | -6.125282E-02 | -7.442138E-02 | | |
| 71 | 8.334654E-02 | 1.650894E-01 | -1.254268E-01 | 1.117668E-03 | 1.059753E-03 |
| 72 | -2.044707E-03 | -1.585704E-03 | -5.310315E-04 | 1.229915E-05 | -1.513238E-05 |
| 81 | 7.306172E-04 | -3.863409E-04 | 4.997823E-05 | 6.544048E-08 | 3.438276E-08 |
| 82 | -5.334839E-05 | 2.606334E-05 | -1.036887E-06 | 2.064689E-07 | -1.959274E-08 |
| Surface | $R_N$ | | | | |
| 31 | 1.000000E+00 | | | | |
| 32 | 1.000000E+00 | | | | |
| 41 | 1.000000E+00 | | | | |
| 42 | 1.000000E+00 | | | | |
| 51 | 1.000000E+00 | | | | |
| 52 | 1.000000E+00 | | | | |
| 61 | 1.000000E+00 | | | | |
| 62 | 1.000000E+00 | | | | |
| 71 | 1.063588E+00 | | | | |
| 72 | 1.052727E+00 | | | | |
| 81 | 1.061579E+00 | | | | |
| 82 | 1.063685E+00 | | | | |

FIG. 25

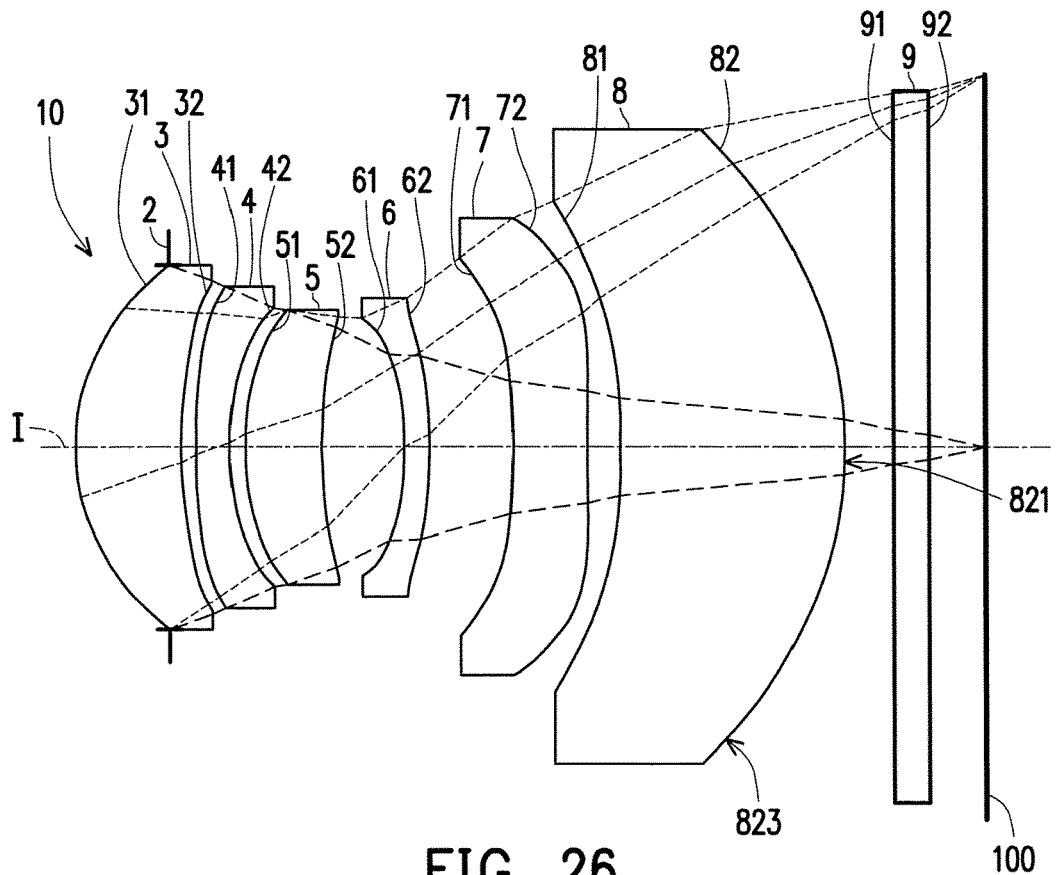
FIG. 26
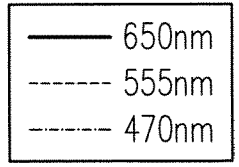
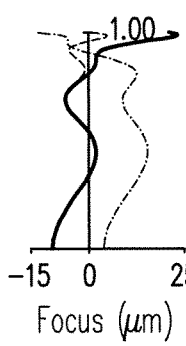
Longitudinal
spherical aberration
Field of view
FIG. 27A
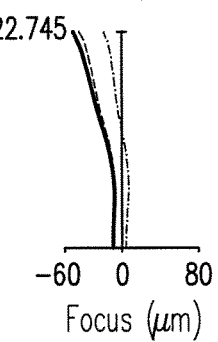
Field curvature
(sagittal direction)
HFOV(°)
FIG. 27B
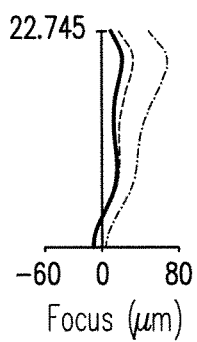
Field curvature
(tangential direction)
HFOV(°)
FIG. 27C
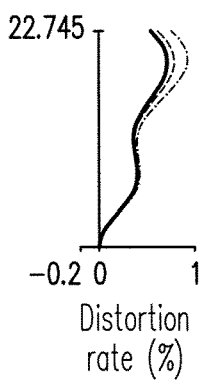
Distortion
HFOV(°)
FIG. 27D

| Sixth embodiment |||||||
|---|---|---|---|---|---|---|
| EFL=5.437 mm, HFOV= 22.744°, Fno=2.45, System length=5.500 mm, Image height=2.297 mm |||||||
| Lens element | Surface | Radius of curvature(mm) | Thickness (mm) | Refractive index | Abbe number | Focal length (mm) |
| Object | | Infinity | Infinity | | | |
| Aperture stop 2 | | Infinity | -0.567 | | | |
| First lens element 3 | Object-side surface 31 | 1.292 | 0.642 | 1.545 | 55.987 | 3.559 |
| | Image-side surface 32 | 3.177 | 0.090 | | | |
| Second lens element 4 | Object-side surface 41 | 4.192 | 0.200 | 1.642 | 22.409 | -4.905 |
| | Image-side surface 42 | 1.773 | 0.092 | | | |
| Third lens element 5 | Object-side surface 51 | 1.554 | 0.465 | 1.545 | 55.987 | 5.494 |
| | Image-side surface 52 | 2.882 | 0.502 | | | |
| Fourth lens element 6 | Object-side surface61 | -2.251 | 0.150 | 1.661 | 20.368 | -12.898 |
| | Image-side surface 62 | -3.130 | 0.502 | | | |
| Fifth lens element 7 | Object-side surface 71 | -7.695 | 0.451 | 1.545 | 55.987 | -7.134 |
| | Image-side surface 72 | 8.059 | 0.201 | | | |
| Sixth lens element 8 | Object-side surface 81 | -4.736 | 1.358 | 1.661 | 20.368 | 6.702 |
| | Image-side surface 82 | -2.563 | 0.300 | | | |
| Filter 9 | Object-side surface 91 | Infinity | 0.210 | 1.517 | 64.167 | |
| | Image-side surface 92 | Infinity | 0.338 | | | |
| | Image plane 100 | Infinity | | | | |

FIG. 28

| Surface | K | $a_4$ | $a_6$ | $a_8$ | $a_{10}$ |
|---|---|---|---|---|---|
| 31 | 0.000000E+00 | -1.294028E-02 | -9.365299E-05 | -2.886832E-03 | -2.482689E-03 |
| 32 | 0.000000E+00 | -9.285834E-03 | 5.808685E-03 | 1.346576E-02 | 5.767320E-03 |
| 41 | 0.000000E+00 | 1.839446E-02 | -3.432672E-04 | 3.354301E-02 | 3.623855E-02 |
| 42 | 0.000000E+00 | 1.981885E-03 | 1.910404E-02 | 6.769494E-02 | 1.184868E-01 |
| 51 | 0.000000E+00 | -4.300466E-02 | 1.307424E-02 | 4.676889E-02 | 9.199383E-02 |
| 52 | 0.000000E+00 | 5.745335E-03 | -1.059554E-03 | -7.743951E-02 | -1.196286E-01 |
| 61 | 0.000000E+00 | -1.374016E-01 | -2.958428E-01 | 2.842913E-01 | -5.594040E-01 |
| 62 | 0.000000E+00 | -4.938892E-02 | -1.191531E-01 | 1.246252E-01 | 1.353786E-01 |
| 71 | -1.215068E+00 | -2.992414E-01 | -1.936918E-02 | 3.180136E-03 | -4.003429E-02 |
| 72 | 0.000000E+00 | -2.914132E-01 | 6.684654E-02 | -6.097904E-02 | 2.470551E-02 |
| 81 | 0.000000E+00 | -6.507082E-02 | 2.295365E-02 | -6.723324E-03 | 1.194228E-03 |
| 82 | -9.468376E+00 | -7.618367E-02 | 1.866960E-02 | -6.710490E-04 | -4.204512E-04 |
| Surface | $a_{12}$ | $a_{14}$ | $a_{16}$ | $a_{18}$ | $a_{20}$ |
| 31 | -1.704865E-03 | -2.291185E-03 | 9.136754E-04 | | |
| 32 | 7.497345E-03 | 8.660719E-03 | -9.019419E-03 | | |
| 41 | 1.200440E-02 | -2.207394E-02 | -5.849281E-03 | | |
| 42 | 8.712670E-02 | -6.261820E-04 | -1.891767E-01 | | |
| 51 | 3.975378E-02 | -2.701606E-02 | -3.959991E-02 | | |
| 52 | 2.001299E-01 | 4.136580E-01 | -6.250871E-01 | | |
| 61 | 3.556366E-01 | 1.384604E+00 | -2.390025E+00 | | |
| 62 | 7.233549E-02 | -6.084770E-02 | -7.071294E-02 | | |
| 71 | 8.014488E-02 | 1.622056E-01 | -1.278917E-01 | -8.230651E-04 | -6.400858E-04 |
| 72 | -2.129264E-03 | -1.104579E-03 | -2.574503E-04 | 1.020471E-04 | -9.266773E-06 |
| 81 | 7.368058E-04 | -3.839793E-04 | 5.086069E-05 | 3.956489E-07 | 1.301542E-07 |
| 82 | -5.128380E-05 | 2.558242E-05 | -1.260689E-06 | 1.392784E-07 | -3.768892E-08 |

| Surface | $R_N$ |
|---|---|
| 31 | 1.000000E+00 |
| 32 | 1.000000E+00 |
| 41 | 1.000000E+00 |
| 42 | 1.000000E+00 |
| 51 | 1.000000E+00 |
| 52 | 1.000000E+00 |
| 61 | 1.000000E+00 |
| 62 | 1.000000E+00 |
| 71 | 1.185309E+00 |
| 72 | 1.145472E+00 |
| 81 | 9.945638E-01 |
| 82 | 1.004660E+00 |

FIG. 29

| Condition | First embodiment | Second embodiment | Third embodiment | Fourth embodiment | Fifth embodiment | Sixth embodiment |
|---|---|---|---|---|---|---|
| T1 | 0.665 | 0.669 | 0.844 | 0.621 | 0.631 | 0.642 |
| G12 | 0.048 | 0.044 | 0.136 | 0.065 | 0.066 | 0.090 |
| T2 | 0.157 | 0.149 | 0.435 | 0.187 | 0.200 | 0.200 |
| G23 | 0.059 | 0.062 | 0.174 | 0.053 | 0.044 | 0.092 |
| T3 | 0.469 | 0.469 | 0.610 | 0.458 | 0.465 | 0.465 |
| G34 | 0.482 | 0.479 | 0.439 | 0.482 | 0.502 | 0.502 |
| T4 | 0.218 | 0.210 | 0.170 | 0.239 | 0.199 | 0.150 |
| G45 | 0.346 | 0.323 | 0.335 | 0.593 | 0.483 | 0.502 |
| T5 | 0.321 | 0.339 | 0.246 | 0.198 | 0.212 | 0.451 |
| G56 | 0.318 | 0.310 | 0.185 | 0.488 | 0.201 | 0.201 |
| T6 | 0.683 | 0.722 | 1.082 | 0.664 | 1.189 | 1.358 |
| BFL | 0.848 | 0.848 | 0.847 | 0.848 | 0.848 | 0.848 |
| EFL | 4.752 | 4.707 | 5.460 | 5.404 | 5.407 | 5.437 |
| TTL | 4.615 | 4.624 | 5.503 | 4.898 | 5.041 | 5.500 |
| ALT | 2.513 | 2.558 | 3.388 | 2.367 | 2.896 | 3.265 |
| AAG | 1.254 | 1.219 | 1.269 | 1.682 | 1.297 | 1.387 |
| GmaxF | 0.482 | 0.479 | 0.439 | 0.593 | 0.502 | 0.502 |
| GmaxT | 0.318 | 0.310 | 0.185 | 0.482 | 0.201 | 0.201 |
| GmaxF/GmaxT | 1.516 | 1.545 | 2.378 | 1.231 | 2.498 | 2.497 |
| T1/T2 | 4.233 | 4.494 | 1.940 | 3.322 | 3.159 | 3.209 |
| EFL/TTL | 1.030 | 1.018 | 0.992 | 1.103 | 1.073 | 0.989 |
| EFL/ALT | 1.891 | 1.840 | 1.612 | 2.283 | 1.867 | 1.665 |
| ALT/AAG | 2.003 | 2.099 | 2.669 | 1.407 | 2.233 | 2.355 |
| (G12+G45)/T4 | 1.808 | 1.746 | 2.765 | 2.753 | 2.755 | 3.946 |
| T6/(G23+G56) | 1.808 | 1.939 | 3.013 | 1.226 | 4.849 | 4.635 |
| ALT/(G23+G34) | 4.638 | 4.726 | 5.520 | 4.423 | 5.301 | 5.499 |
| TTL/BFL | 5.442 | 5.453 | 6.497 | 5.776 | 5.945 | 6.486 |
| (G34+G45+G56)/(T4+T5) | 2.127 | 2.025 | 2.304 | 3.580 | 2.884 | 2.005 |
| (T5+T6)/T4 | 4.601 | 5.041 | 7.797 | 3.601 | 7.025 | 12.054 |
| (G45+G56)/T2 | 4.231 | 4.252 | 1.193 | 5.785 | 3.424 | 3.512 |
| EFL/(T3+T4) | 6.915 | 6.934 | 7.000 | 7.751 | 8.141 | 8.847 |
| AAG/T2 | 7.985 | 8.182 | 2.915 | 8.996 | 6.487 | 6.932 |
| (G56+T6)/T1 | 1.505 | 1.541 | 1.500 | 1.856 | 2.201 | 2.428 |
| (G34+G45)/G56 | 2.604 | 2.587 | 4.188 | 2.202 | 4.901 | 4.994 |
| TTL/(G23+G45) | 11.375 | 12.005 | 10.816 | 7.574 | 9.559 | 9.264 |

FIG. 30

OPTICAL IMAGING LENS

CROSS-REFERENCE TO RELATED APPLICATION

This application claims the priority benefit of Chinese application serial no. 201710408063.4, filed on Jun. 2, 2017. The entirety of the above-mentioned patent application is hereby incorporated by reference herein and made a part of this specification.

BACKGROUND OF THE INVENTION

1. Field of the Invention

The invention relates to an optical element, and more particularly, to an optical imaging lens.

2. Description of Related Art

With ever-changing specifications in consumer electronics (e.g., cell phones, cameras, tablet PCs, personal digital assistants, car photography devices), the pursuit for thin and small design never stops. This is why critical parts in electronic product, such as optical lenses, must also continue to improve in terms of specification to meet the needs of consumers. The most important characteristic of an optical lens is nothing more than its imaging quality and volume. As technology advances and size reduces in the field of charge coupled device (CCD) or complementary metal oxide semiconductor (CMOS) sensing elements, an optical imaging lens installed in a camera module also needs to be downsized, and yet, it is also very important to maintain favorable optical performance for the optical imaging lens.

However, in optical lens design, downsizing a lens with good imaging quality will not necessary guarantee that the optical lens can be manufactured with both imaging quality and miniaturization taken into consideration. Instead, the design process involves not only material characteristics but also practical problems in production (the manufacturing process, assembling yield rate, etc.). In a conventional six piece lens structure, the distance from an object-side surface of the lens closest to an object side to an image plane along an optical axis being relatively large and is thus not conducive in a thin product design for cell phones and digital camera. Therefore, it is very much needed to develop a lens with favorable imaging quality as well as shortened lens length.

SUMMARY OF THE INVENTION

The invention is directed to an optical imaging lens, which can provide favorable imaging quality with a system length of the lens shortened.

An embodiment of the invention provides an optical imaging lens, which includes a first lens element, a second lens element, a third lens element, a fourth lens element, a fifth lens element, and a sixth lens element from an object side to an image side in order along an optical axis. The first lens element to the sixth lens element each include an object-side surface facing the object side and allowing imaging rays to pass through and an image-side surface facing the image side and allowing the imaging rays to pass through. The first lens element is made of plastic material, and the second lens element is made of plastic material. The third lens element has positive refracting power, and the image-side surface of the third lens element has a concave portion in a vicinity of the optical axis. The fourth lens element has negative refracting power, and the object-side surface of the fourth lens element has a concave portion in a vicinity of the optical axis. The object-side surface of the fifth lens element has a concave portion in a vicinity of the optical axis, the image-side surface of the fifth lens element has a concave portion in a vicinity of the optical axis, and the sixth lens element is made of plastic material. Lens elements having refracting power included by the optical imaging lens are only the six lens elements described above. The optical imaging lens satisfies: GmaxF/GmaxT≤2.5, wherein GmaxF is a first greatest value among five air gaps of the first lens element to the sixth lens element along the optical axis, and GmaxT is a third greatest value among the five air gaps of the first lens element to the sixth lens element along the optical axis.

An embodiment of the invention provides an optical imaging lens, which includes a first lens element, a second lens element, a third lens element, a fourth lens element, a fifth lens element, and a sixth lens element from an object side to an image side in order along an optical axis. The first lens element to the sixth lens element each include an object-side surface facing the object side and allowing imaging rays to pass through and an image-side surface facing the image side and allowing the imaging rays to pass through. The first lens element is made of plastic material, the image-side surface of the first lens element has a concave portion in a vicinity of a periphery of the first lens element, and the second lens element is made of plastic material. The third lens element has positive refracting power, and the image-side surface of the third lens element has a concave portion in a vicinity of the optical axis. The fourth lens element has negative refracting power, and the object-side surface of the fourth lens element has a concave portion in a vicinity of the optical axis. The fifth lens element has negative refracting power, the object-side surface of the fifth lens element has a concave portion in a vicinity of the optical axis, and the sixth lens element is made of plastic material. Lens elements having refracting power included by the optical imaging lens are only the six lens elements described above. The optical imaging lens satisfies: GmaxF/GmaxT≤2.5, wherein GmaxF is a first greatest value among five air gaps of the first lens element to the sixth lens element along the optical axis, and GmaxT is a third greatest value among the five air gaps of the first lens element to the sixth lens element along the optical axis.

Based on the above, in the embodiments of the invention, the optical imaging lens can provide the following advantageous effects. With the refracting power and surface design for aforesaid lens elements together with the design for making the air gaps of the those lens elements satisfying the conditions described above, an imaging quality can be ensured and an telephoto effect can be achieved while effectively shortening the lens length for the optical imaging lens.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic view illustrating a surface structure of a lens element.

FIG. 2 is a schematic view illustrating a concave and convex surface structure of a lens element and a ray focal point.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 6 is a schematic view illustrating an optical imaging lens according to a first embodiment of the invention.

FIG. 7A to FIG. 7D illustrate a longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view illustrating an optical imaging lens according to a second embodiment of the invention.

FIG. 11A to FIG. 11D illustrate a longitudinal spherical aberration and other aberrations of the optical imaging lens according to the second embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 14 is a schematic view illustrating an optical imaging lens according to a third embodiment of the invention.

FIG. 15A to FIG. 15D illustrate a longitudinal spherical aberration and other aberrations of the optical imaging lens according to the third embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIG. 19A to FIG. 19D illustrate a longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 22 is a schematic view illustrating an optical imaging lens according to a fifth embodiment of the invention.

FIG. 23A to FIG. 23D illustrate a longitudinal spherical aberration and other aberrations of the optical imaging lens according to the fifth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 26 is a schematic view illustrating an optical imaging lens according to a sixth embodiment of the invention.

FIG. 27A to FIG. 27D illustrate a longitudinal spherical aberration and other aberrations of the optical imaging lens according to the sixth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 shows important parameters and values in related relational expressions pertaining to the optical imaging lens according to the first to the sixth embodiments of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted. The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object side or image side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic view illustrating an optical imaging lens according to a first embodiment of the invention, and FIG. 7A to FIG. 7D illustrate a longitudinal spherical aberration and other aberrations of the optical imaging lens according to the first embodiment of the invention. Referring to FIG. 6, an optical imaging lens 10 in the first embodiment of the invention includes an aperture stop 2, a first lens element 3, a second lens element 4, a third lens element 5, a fourth lens element 6, a fifth lens element 7, a sixth lens element 8 and a filter 9 from the object side to the image side in order along the optical axis I. After entering the optical imaging lens 10 and passing through the aperture stop 2, the first lens element 3, the second lens element 4, the third lens element 5, the fourth lens element 6, the fifth lens element 7 the sixth lens element 8 and the filter 9, light rays emitted by a to-be-photographed object form an image on an image plane 100. The filter 9 is, for example, an IR cut-off filter, which is used to prevent infra-red rays in the light rays from being transmitted to the image plane 100 thereby affecting the imaging quality. It should be noted that, the object side is one side that faces the to-be-photographed object, and the image side is one side that faces the image plane 100.

In the present embodiment, the first lens element 3, the second lens element 4, the third lens element 5, the fourth lens element 6, the fifth lens element 7, the sixth lens element 8 and the filter 9 of the optical imaging lens 10 each include an object-side surface 31, 41, 51, 61, 71, 81, 91 facing the object side and allowing the imaging rays to pass through and an image-side surface 32, 42, 52, 62, 72, 82, 92 facing the image side and allowing the imaging rays to pass through. In the present embodiment, the aperture stop 2 is placed at the object-side surface 31 of the first lens element 3.

In addition, to satisfy the demand for lighter products, all of the first lens element 3 to the sixth lens element 8 are provided with refracting power and made of plastic material, but the materials of the first lens element 3 to the sixth lens element 8 are not limited to the above.

The first lens element 3 has positive refracting power. The object-side surface 31 of the first lens element 3 is a convex surface, and has a convex portion 311 in a vicinity of the optical axis I and a convex portion 313 in a vicinity of a periphery of the first lens element 3. The image-side surface 32 of the first lens element 3 is a concave surface, and has a concave portion 322 in a vicinity of the optical axis I and a concave portion 324 in a vicinity of a periphery of the first lens element 3. In the present embodiment, each of the object-side surface 31 and the image-side surface 32 of the first lens element 3 is an aspheric surface.

The second lens element 4 has negative refracting power. The object-side surface 41 of the second lens element 4 is a convex surface, and has a convex portion 411 in a vicinity of the optical axis I and a convex portion 413 in a vicinity of a periphery of the second lens element 4. The image-side surface 42 of the second lens element 4 is a concave surface, and has a concave portion 422 in a vicinity of the optical axis I and a concave portion 424 in a vicinity of a periphery of the second lens element 4. In the present embodiment, each of the object-side surface 41 and the image-side surface 42 of the second lens element 4 is an aspheric surface.

The third lens element 5 has positive refracting power. The object-side surface 51 of the third lens element 5 is a convex surface, and has a convex portion 511 in a vicinity of the optical axis I and a convex portion 513 in a vicinity of a periphery of the third lens element 5. The image-side surface 52 of the third lens element 5 is a concave surface, and has a concave portion 522 in a vicinity of the optical axis I and a concave portion 524 in a vicinity of a periphery of the third lens element 5. In the present embodiment, each of the object-side surface 51 and the image-side surface 52 of the third lens element 5 is an aspheric surface.

The fourth lens element 6 has negative refracting power. The object-side surface 61 of the fourth lens element 6 is a concave surface, and has a concave portion 612 in a vicinity of the optical axis I and a concave portion 614 in a vicinity of a periphery of the fourth lens element 6. The image-side surface 62 of the fourth lens element 6 is a convex surface, and has a convex portion 621 in a vicinity of the optical axis I and a convex portion 623 in a vicinity of a periphery of the fourth lens element 6. In the present embodiment, each of the object-side surface 61 and the image-side surface 62 of the fourth lens element 6 is an aspheric surface.

The fifth lens element 7 has negative refracting power. The object-side surface 71 of the fifth lens element 7 is a concave surface, and has a concave portion 712 in a vicinity of the optical axis I and a concave portion 714 in a vicinity of a periphery of the fifth lens element 7. The image-side surface 72 of the fifth lens element 7 has a concave portion 722 in a vicinity of the optical axis I and a convex portion 723 in a vicinity of a periphery of the fifth lens element 7. In the present embodiment, each of the object-side surface 71 and the image-side surface 72 of the fifth lens 7 is an extended asphere surface.

The sixth lens element 8 has positive refracting power. The object-side surface 81 of the sixth lens element 8 has a convex portion 811 in a vicinity of the optical axis I and a concave portion 814 in a vicinity of a periphery of the sixth lens element 8. The image-side surface 82 of the sixth lens element 8 has a concave portion 822 in a vicinity of the optical axis I and a convex portion 823 in a vicinity of a periphery of the sixth lens element 8. In the present embodiment, each of the object-side surface 81 and the image-side surface 82 of the sixth lens element 8 is an extended asphere surface.

In the present embodiment, lens elements having refracting power included by the optical imaging lens 10 are only the six lens elements described above.

Other detailed optical data of the first embodiment are shown in FIG. 8, in which the optical imaging lens 10 of the first embodiment has an overall effective focal length (EFL) being 4.752 mm (millimeter), a half field of view (HFOV) being 24.239° a f-number (Fno) being 2.45, a system length being 4.615 mm and an image height being 2.297 mm. Herein, the system length refers to a distance from the object-side surface 31 of the first lens element 3 to the image plane 100 along the optical axis I.

Further, in the present embodiment, all of the object-side surfaces 31, 41, 51, 61, 71, and 81 and the image-side surfaces 32, 42, 52, 62, 72, and 82 of the first lens element 3, the second lens element 4, the third lens element 5, the fourth lens element 6, the fifth lens element 7 and the sixth lens element 8 (12 surfaces in total) are aspheric surfaces. The object-side surfaces 31, 41, 51 and 61 and the image-side surfaces 32, 42, 52 and 62 are common even asphere surfaces, whereas the object-side surfaces 71 and 81 and the image-side surfaces 72 and 82 are the extended asphere surfaces. These aspheric surfaces are defined by the following formula.

$$Z(Y) = \frac{Y^2}{R} \bigg/ \left(1 + \sqrt{1-(1+K)\frac{Y^2}{R^2}}\right) + \sum_{i=1}^{n} a_{2i} \times \left(\frac{Y}{R_N}\right)^{2i} \quad (1)$$

wherein

Y: a distance from a point on an aspheric curve to the optical axis I;

Z: a depth of the aspheric surface (a perpendicular distance between the point on the aspheric surface that is spaced from the optical axis I by the distance Y and a tangent plane tangent to a vertex of the aspheric surface on the optical axis I);

R: a radius of curvature of the surface of the lens element close to the optical axis I;

K: a conic constant;

$a_{2i}$: the $2i^{th}$ aspheric coefficient;

$R_N$: a normalization radius. The aspheric surface defined by Formula (1) is a common even asphere surface when $R_N=1$, and the aspheric surface defined by Formula (1) is an extended asphere surface when $R_N \neq 1$.

The aspheric coefficients of the object-side surface 31 of the first lens element 3 to the image-side surface 82 of the sixth lens element 8 in Formula (1) are shown in FIG. 9. In FIG. 9, a field number "31" indicates that the respective row includes the aspheric coefficients of the object-side surface 31 of the first lens element 3, and the same applies to the rest of fields.

In addition, the relationship between the important parameters in the optical imaging lens 10 of the first embodiment is shown in FIG. 30.

Therein,

EFL is the effective focal length of the optical imaging lens 10;

HFOV is the half field of view of the optical imaging lens 10;

Fno is the f-number of the optical imaging lens 10;

T1 is a thickness of the first lens element 3 along the optical axis I;

T2 is a thickness of the second lens element 4 along the optical axis I;

T3 is a thickness of the third lens element 5 along the optical axis I;

T4 is a thickness of the fourth lens element 6 along the optical axis I;

T5 is a thickness of the fifth lens element 7 along the optical axis I;

T6 is a thickness of the sixth lens element 8 along the optical axis I;

G12 is a distance from the image-side surface 32 of the first lens element 3 to the object-side surface 41 of the second lens element 4 along the optical axis I, that is, an air gap from the first lens element 3 to the second lens element 4 along the optical axis I;

G23 is a distance from the image-side surface 42 of the second lens element 4 to the object-side surface 51 of the third lens element 5 along the optical axis I, that is, an air gap from the second lens element 4 to the third lens element 5 along the optical axis I;

G34 is a distance from the image-side surface 52 of the third lens element 5 to the object-side surface 61 of the fourth lens element 6 along the optical axis I, that is, an air gap from the third lens element 5 to the fourth lens element 6 along the optical axis I;

G45 is a distance from the image-side surface 62 of the fourth lens element 6 to the object-side surface 71 of the fifth lens element 7 along the optical axis I, that is, an air gap from the fourth lens element 6 to the fifth lens element 7 along the optical axis I;

G56 is a distance from the image-side surface 72 of the fifth lens element 7 to the object-side surface 81 of the sixth lens element 8 along the optical axis I, that is, an air gap from the fifth lens element 7 to the sixth lens element 8 along the optical axis I;

G6F is a distance from the image-side surface 82 of the sixth lens element 8 to the object-side surface 91 of the filter 9 along the optical axis I, that is, an air gap from the sixth lens element 8 to the filter 9 along the optical axis I;

TF is a thickness of the filter 9 along the optical axis I;

GFP is a distance from the image-side surface 92 of the filter 9 to the image plane 100 along the optical axis I, that is, an air gap from the filter 9 to the image plane 100 along the optical axis I;

TTL is a distance from the object-side surface 31 of the first lens element 3 to the image plane 100 along the optical axis I;

BFL is a distance from the image-side surface 82 of the sixth lens element 8 to the image plane 100 along the optical axis I;

AAG is a sum of the five air gaps of the first lens element 3 to the sixth lens element 8 along the optical axis I, that is, a sum of G12, G23, G34, G45 and G56;

ALT is a sum of the thicknesses of the first lens element 3, the second lens element 4, the third lens element 5, the fourth lens element 6, the fifth lens element 7 and the sixth lens element 8 along the optical axis I, that is, a sum of T1, T2, T3, T4, T5 and T6;

TL is a distance from the object-side surface 31 of the first lens element 3 to the image-side surface 82 of the sixth lens element 8 along the optical axis I;

GmaxF is a first greatest value among the five air gaps of the first lens element 3 to the sixth lens element 8 along the optical axis I, that is, a first greatest value among G12, G23, G34, G45 and G56;

GmaxT is a third greatest value among the five air gaps of the first lens element 3 to the sixth lens element 8 along the optical axis I, that is, a third greatest value among G12, G23, G34, G45 and G56;

Besides, it is further defined that:

f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
f6 is a focal length of the sixth lens element 8;
n1 is a refractive index of the first lens element 3;
n2 is a refractive index of the second lens element 4;
n3 is a refractive index of the third lens element 5;
n4 is a refractive index of the fourth lens element 6;
n5 is a refractive index of the fifth lens element 7;
n6 is a refractive index of the sixth lens element 8;
v1 is an Abbe number of the first lens element 3;
v2 is an Abbe number of the second lens element 4;
v3 is an Abbe number of the third lens element 5;
v4 is an Abbe number of the fourth lens element 6;
v5 is an Abbe number of the fifth lens element 7; and
v6 is an Abbe number of the sixth lens element 8.

With reference to FIG. 7A to FIG. 7D, FIG. 7A is a drawing illustrating a longitudinal spherical aberration in the first embodiment, FIG. 7B and FIG. 7C are drawings respectively illustrating a field curvature aberration in the sagittal direction and a field curvature aberration in the tangential direction on the image plane 100 in the first embodiment, and FIG. 7D is a drawing illustrating a distortion aberration on the image plane 100 in the first embodiment. The longitudinal spherical aberration of the first embodiment depicted in FIG. 7A is simulated when a pupil radius is 0.9698 mm. Further, in the longitudinal spherical aberration of the first embodiment depicted in FIG. 7A, the curve of each wavelength (i.e., each of wavelengths 650 nanometer (nm), 555 nm and 470 nm, as shown in the drawing) is very close to one another and approaches the center position, and indicates that off-axis rays of each wavelength at different heights are concentrated around an imaging point. In view of a skew margin of the curve for each wavelength, imaging point deviations of the off-axis rays at different heights are controlled within a range of ±7.8 micrometer (μm). Hence, it is evident that the spherical aberration of the same wavelength can be significantly improved according to the present embodiment. In addition, distances between of the three representative wavelengths red, green, and blue (i.e., the three wavelengths 650 nm, 555 nm and 470 nm, as shown in the drawing) are also very close to one another, and indicates that the imaging positions of the rays with different wavelengths are pretty concentrated so the chromatic aberration can be significantly improved as well.

In the two diagrams of the field curvature aberrations as illustrated in FIG. 7B and FIG. 7C, the focal length variation of the three representative wavelengths in the entire field of view falls within the range of ±60 μm, and indicates that aberration of the optical system provided by the first embodiment can be effectively eliminated. In FIG. 7D, the diagram of distortion aberration shows that the distortion aberration in the first embodiment is maintained within the range of ±9.1%, and indicates that the distortion aberration in the first embodiment can comply with the imaging quality required by the optical system. Accordingly, compared to the existing optical lenses, with the system length shortened to approximately 4.615 mm, the first embodiment can still provide more preferable imaging quality. Therefore, the first embodiment is capable of shortening the lens length while maintaining favorable optical properties, so as to realize the thin product design.

FIG. 10 is a schematic view illustrating an optical imaging lens according to a second embodiment of the invention, and FIG. 11A to FIG. 11D illustrate a longitudinal spherical aberration and other aberrations of the optical imaging lens according to the second embodiment of the invention. With reference to FIG. 10, the second embodiment of the optical imaging lens 10 is substantially similar to the first embodiment, and the difference between the two is that, the optical data, the aspheric coefficients, and the parameters of the lens elements 3, 4, 5, 6, 7 and 8 in these embodiments are different to some extent. Here, it should be noted that, for clear illustration, the reference numbers for part of the concave portions and the convex portions similar to those in the first embodiment are omitted in FIG. 10.

Detailed optical data of the optical imaging lens 10 of the second embodiment are shown in FIG. 12, in which the optical imaging lens 10 of the second embodiment has an overall effective local length being 4.707 mm, a half field of view (HFOV) being 24.312°, a f-number (Fno) being 2.45, a system length being 4.624 mm, and an image height being 2.297 mm. Moreover, in the present embodiment, all of the first lens element 3 to the sixth lens element 8 are made of plastic material.

FIG. 13 shows the aspheric coefficients of the object-side surface 31 of the first lens element 3 to the image-side surface 82 of the sixth lens element 8 in Formula (1) according to the second embodiment.

In addition, the relationship between the important parameters in the optical imaging lens 10 of the second embodiment is shown in FIG. 30.

The longitudinal spherical aberration of the second embodiment depicted in FIG. 11A is simulated when a pupil radius is 0.9605 mm. In the longitudinal spherical aberration of the second embodiment depicted in FIG. 11A, imaging point deviations of the off-axis rays at different heights are controlled within a range of ±8.5 μm. In the two diagrams of the field curvature aberrations as illustrated in FIG. 11B and FIG. 11C, the focal length variation of the three representative wavelengths in the entire field of view falls within the range of ±70 μm. In FIG. 11D, the diagram of distortion aberration shows that the distortion aberration in the second embodiment is maintained within the range of ±11%. Accordingly, compared to the existing optical lenses, with the system length shortened to approximately 4.624 mm, the second embodiment can still provide more preferable imaging quality.

In view of the above description, compared to the first embodiment, the advantages of the second embodiment are as follows. Because each lens element has smaller difference between the thicknesses in the vicinity of the optical axis I and in the vicinity of the periphery of the lens element, the second embodiment is easier to manufacture than the first embodiment and therefore has higher yield rate.

FIG. 14 is a schematic view illustrating an optical imaging lens according to a third embodiment of the invention, and FIG. 15A to FIG. 15D illustrate a longitudinal spherical aberration and other aberrations of the optical imaging lens according to the third embodiment of the invention. With reference to FIG. 14, the third embodiment of the optical imaging lens 10 is substantially similar to the first embodiment, and the major difference between the two is that, the optical data, the aspheric coefficients, and the parameters of the lens elements 3, 4, 5, 6, 7 and 8 in these embodiments are different to some extent. Here, it should be noted that, for clear illustration, the reference numbers for part of the concave portions and the convex portions similar to those in the first embodiment are omitted in FIG. 14.

Detailed optical data of the optical imaging lens 10 of the third embodiment are shown in FIG. 16, in which the optical imaging lens 10 of the third embodiment has an overall effective local length being 5.460 mm, a half field of view (HFOV) being 22.111°, a f-number (Fno) being 2.45, a system length being 5.503 mm, and an image height being 2.297 mm. Moreover, in the present embodiment, all of the first lens element 3 to the sixth lens element 8 are made of plastic material.

FIG. 17 shows the aspheric coefficients of the object-side surface 31 of the first lens element 3 to the image-side surface 82 of the sixth lens element 8 in Formula (1) according to the third embodiment.

In addition, the relationship between the important parameters in the optical imaging lens 10 of the third embodiment is shown in FIG. 30.

The longitudinal spherical aberration of the third embodiment depicted in FIG. 15A is simulated when a pupil radius is 1.1142 mm. In the longitudinal spherical aberration of the third embodiment depicted in FIG. 15A, imaging point deviations of the off-axis rays at different heights are controlled within a range of +8.9 μm. In the two diagrams of the field curvature aberrations as illustrated in FIG. 15B and FIG. 15C, the focal length variation of the three representative wavelengths in the entire field of view falls within the range of ±28 μm. In FIG. 15D, the diagram of distortion aberration shows that the distortion aberration in the third embodiment is maintained within the range of ±4.5%. Accordingly, compared to the existing optical lenses, with the system length shortened to approximately 5.503 mm, the third embodiment can still provide more preferable imaging quality.

In view of the above description, compared to the first embodiment, the advantages of the third embodiment are as follows. The half field of view of the third embodiment is less than the half field of view of the first embodiment, and is thus more favorable for telephoto use. The field curvature aberration of the third embodiment is less than the field curvature aberration of the first embodiment, and the distortion aberration of the third embodiment is less than the distortion aberration of the first embodiment. In addition, because each lens element has smaller difference between the thicknesses in the vicinity of the optical axis I and in the vicinity of the periphery of the lens element, the third embodiment is easier to manufacture than the first embodiment and therefore has higher yield rate.

FIG. 18 is a schematic view illustrating an optical imaging lens according to a fourth embodiment of the invention, and FIG. 19A to FIG. 19D illustrate a longitudinal spherical aberration and other aberrations of the optical imaging lens according to the fourth embodiment of the invention. With reference to FIG. 18, the fourth embodiment of the optical imaging lens 10 is substantially similar to the first embodiment, and the difference between the two is that, the optical data, the aspheric coefficients, and the parameters of the lens elements 3, 4, 5, 6, 7 and 8 in the two embodiments are different to some extent. Further, in the fourth embodiment, the image-side surface 62 of the fourth lens element 6 has a convex portion 621 in a vicinity of the optical axis I and a concave portion 624 in a vicinity of a periphery of the fourth lens element 6. The image-side surface 82 of the sixth lens element 8 is a convex surface and has a convex portion 821 in a vicinity of the optical axis I and a convex portion 823 in a vicinity of the periphery of the sixth lens element 8. Here, it should be noted that, for clear illustration, the reference numbers for part of the concave portions and the convex portions similar to those in the first embodiment are omitted in FIG. 18.

Detailed optical data of the optical imaging lens 10 of the fourth embodiment are shown in FIG. 20, in which the optical imaging lens 10 of the fourth embodiment has an overall effective local length being 5.404 mm, a half field of view (HFOV) being 22.752°, a f-number (Fno) being 2.45, a system length being 4.898 mm, and an image height being 2.297 mm. Moreover, in the present embodiment, all of the first lens element 3 to the sixth lens element 8 are made of plastic material.

FIG. 21 shows the aspheric coefficients of the object-side surface 31 of the first lens element 3 to the image-side surface 82 of the sixth lens element 8 in Formula (1) according to the fourth embodiment.

In addition, the relationship between the important parameters in the optical imaging lens 10 of the fourth embodiment is shown in FIG. 30.

The longitudinal spherical aberration of the fourth embodiment depicted in FIG. 19A is simulated when a pupil radius is 1.1027 mm. In the longitudinal spherical aberration of the fourth embodiment depicted in FIG. 19A, imaging point deviations of the off-axis rays at different heights are controlled within a range of ±24 µm. In the two diagrams of the field curvature aberrations as illustrated in FIG. 19B and FIG. 19C, the focal length variation of the three representative wavelengths in the entire field of view falls within the range of ±35 µm. In FIG. 19D, the diagram of distortion aberration shows that the distortion aberration in the fourth embodiment is maintained within the range of ±1.2%. Accordingly, compared to the existing optical lenses, with the system length shortened to approximately 4.898 mm, the fourth embodiment can still provide more preferable imaging quality.

In view of the above description, compared to the first embodiment, the advantages of the fourth embodiment are as follows. The half field of view of the fourth embodiment is less than the half field of view of the first embodiment, and is thus more favorable for telephoto use. The field curvature aberration of the fourth embodiment is less than the field curvature aberration of the first embodiment, and the distortion aberration of the fourth embodiment is less than the distortion aberration of the first embodiment.

FIG. 22 is a schematic view illustrating an optical imaging lens according to a fifth embodiment of the invention, and FIG. 23A to FIG. 23D illustrate a longitudinal spherical aberration and other aberrations of the optical imaging lens according to the fifth embodiment of the invention. With reference to FIG. 22, the fifth embodiment of the optical imaging lens 10 is substantially similar to the first embodiment, and the major difference between the two is that, the optical data, the aspheric coefficients, and the parameters of the lens elements 3, 4, 5, 6, 7 and 8 in the two embodiments are different to some extent. Further, in the fifth embodiment, the image-side surface 62 of the fourth lens element 6 has a convex portion 621 in a vicinity of the optical axis I and a concave portion 624 in a vicinity of a periphery of the fourth lens element 6. The image-side surface 82 of the sixth lens element 8 is a convex surface and has a convex portion 821 in a vicinity of the optical axis I and a convex portion 823 in a vicinity of the periphery of the sixth lens element 8. Here, it should be noted that, for clear illustration, the reference numbers for part of the concave portions and the convex portions similar to those in the first embodiment are omitted in FIG. 22.

Detailed optical data of the optical imaging lens 10 of the fifth embodiment are shown in FIG. 24, in which the optical imaging lens 10 of the fifth embodiment has an overall effective local length being 5.407 mm, a half field of view (HFOV) being 22.851°, a f-number (Fno) being 2.45, a system length being 5.041 mm, and an image height being 2.297 mm. Moreover, in the present embodiment, all of the first lens element 3 to the sixth lens element 8 are made of plastic material.

FIG. 25 shows the aspheric coefficients of the object-side surface 31 of the first lens element 3 to the image-side surface 82 of the sixth lens element 8 in Formula (1) according to the fifth embodiment.

In addition, the relationship between the important parameters in the optical imaging lens 10 of the fifth embodiment is shown in FIG. 30.

The longitudinal spherical aberration of the fifth embodiment depicted in FIG. 23A is simulated when a pupil radius is 1.1035 mm. In the longitudinal spherical aberration of the fifth embodiment depicted in FIG. 23A, imaging point deviations of the off-axis rays at different heights are controlled within a range of ±18.1 µm. In the two diagrams of the field curvature aberrations as illustrated in FIG. 23B and FIG. 23C, the focal length variation of the three representative wavelengths in the entire field of view falls within the range of ±50 µm. In FIG. 23D, the diagram of distortion aberration shows that the distortion aberration in the fifth embodiment is maintained within the range of ±0.7%. Accordingly, compared to the existing optical lenses, with the system length shortened to approximately 5.041 mm, the fifth embodiment can still provide more preferable imaging quality.

In view of the above description, compared to the first embodiment, the advantages of the fifth embodiment are as follows. The half field of view of the fifth embodiment is less than the half field of view of the first embodiment, and is thus more favorable for telephoto use. The field curvature aberration of the fifth embodiment is less than the field curvature aberration of the first embodiment, and the distortion of the fifth embodiment is less than the distortion of the first embodiment. In addition, because each lens element has smaller difference between the thicknesses in the vicinity of the optical axis I and in the vicinity of the periphery of the lens element, the fifth embodiment is easier to manufacture than the first embodiment and therefore has higher yield rate.

FIG. 26 is a schematic view illustrating an optical imaging lens according to a sixth embodiment of the invention, and FIG. 27A to FIG. 27D illustrate a longitudinal spherical aberration and other aberrations of the optical imaging lens according to the sixth embodiment of the invention. With reference to FIG. 26, the sixth embodiment of the optical imaging lens 10 is substantially similar to the first embodiment, and the major difference between the two is that, the optical data, the aspheric coefficients, and the parameters of the lens elements 3, 4, 5, 6, 7 and 8 in the two embodiments are different to some extent. Further, in the sixth embodiment, the image-side surface 82 of the sixth lens element 8 is a convex surface, and has a convex portion 821 in a vicinity of the optical axis I and a convex portion 823 in a vicinity of a periphery of the sixth lens element 8. For clear illustration, it should be mentioned that the same reference numbers of the concave portions and the convex portions in the two embodiments are omitted from FIG. 26.

Detailed optical data of the optical imaging lens 10 of the sixth embodiment are shown in FIG. 28, in which the optical imaging lens 10 of the sixth embodiment has an overall effective local length being 5.437 mm, a half field of view (HFOV) being 22.744°, a f-number (Fno) being 2.45, a system length being 5.500 mm, and an image height being 2.297 mm. Moreover, in the present embodiment, all of the first lens element 3 to the sixth lens element 8 are made of plastic material.

FIG. 29 shows the aspheric coefficients of the object-side surface 31 of the first lens element 3 to the image-side surface 82 of the sixth lens element 8 in Formula (1) according to the sixth embodiment.

In addition, the relationship between the important parameters in the optical imaging lens 10 of the sixth embodiment is shown in FIG. 30.

The longitudinal spherical aberration of the sixth embodiment depicted in FIG. 27A is simulated when a pupil radius is 1.1097 mm. In the longitudinal spherical aberration of the sixth embodiment depicted in FIG. 27A, imaging point deviations of the off-axis rays at different heights are controlled within a range of ±25 µm. In the two diagrams of the field curvature aberrations as illustrated in FIG. 27B and FIG. 27C, the focal length variation of the three representative wavelengths in the entire field of view falls within the range of ±70 µm. In FIG. 27D, the diagram of distortion aberration shows that the distortion aberration in the sixth embodiment is maintained within the range of ±0.95%. Accordingly, compared to the existing optical lenses, with the system length shortened to approximately 5.500 mm, the sixth embodiment can still provide more preferable imaging quality.

In view of the above description, compared to the first embodiment, the advantages of the sixth embodiment are as follows. The half field of view of the sixth embodiment is less than the half field of view of the first embodiment, and is thus more favorable for telephoto use. The distortion aberration of the sixth embodiment is less than the distortion aberration of the first embodiment.

The followings refer to FIG. 30. FIG. 30 is a table chart containing the optical parameters in each of the first embodiment to the sixth embodiment.

If the relational expressions of the optical parameters in the optical imaging lens 10 provided in the embodiments of the invention satisfies at least one of the following conditions, the design of the optical imaging lens with favorable optical performance and the reduced length in whole becomes technical feasible:

1. The optical imaging lens 10 according to the embodiments of the invention can satisfy EFL/TTL≥0.95, and more preferably, satisfy 0.95≤EFL/TTL≤1.5, such that a more preferable telephoto effect can be provided.

2. The optical imaging lens 10 according to the embodiments of the invention can satisfy GmaxF/GmaxT≤2.5. Accordingly, by properly adjusting the air gaps of the lens elements so a ratio of the first greatest air gap to the third greatest air gap is not overly large, the reduced stray light influence, the shortened system length and the telephoto effect can be achieved at the same time. More preferable, 1.1≤GmaxF/GmaxT≤2.5.

3. For achieving the shortened system length for the lens and ensuring the imaging quality, shortening the air gaps of the lens elements or properly shortening the thicknesses of the lens elements is one of the measures taken in the embodiment of the invention. Moreover, when the difficulty in the manufacturing process is further taken into consideration, a more preferable configuration may also be accomplished if at least one of the numerical limitations in the following conditions can be satisfied.

T1/T2≤4.5, and more preferably, 1.8≤T1/T2≤4.5;
EFL/ALT≥1.6, and more preferably, 1.6≤EFL/ALT≤2.5;
ALT/AAG≤2.7, and more preferably, 1.3≤ALT/AAG≤2.7;
(G12+G45)/T4≤4.0, and more preferably, 1.5≤(G12+G45)/T4≤4.0;
T6/(G23+G56)≤5.0, and more preferably, 1.0≤T6/(G23+G56)≤5.0;
ALT/(G23+G34)≤5.6, and more preferably, 4.0≤ALT/(G23+G34)≤5.6;
TTL/BFL≤8.0, and more preferably, 5.0≤TTL/BFL≤8.0;
(G34+G45+G56)/(T4+T5)≥=2.0, and more preferably, 2.0≤(G34+G45+G56)/(T4+T5)≤3.8;
(T5+T6)/T4≥3.5, and more preferably, 3.5≤(T5+T6)/T4≤12.5;
(G45+G56)/T2≤6.0, and more preferably, 1.0≤(G45+G56)/T2≤6.0;
EFL/(T3+T4)≥6.9, and more preferably, 6.9≤EFL/(T3+T4)≤9.0;
AAG/T2≤9.0, and more preferably, 2.8≤AAG/T2≤9.0;
(G56+T6)/T1≥1.5, and more preferably, 1.5≤(G56+T6)/T1≤2.6;
(G34+G45)/G56≤5.5, and more preferably, 1.0≤(G34+G45)/G56≤5.5;
TTL/(G23+G45)≥6.0, and more preferably, 6.0≤TTL/(G23+G45)≤12.5.

Due to the unpredictability in an optical system design, with the framework set forth in the embodiments of the invention, the shortened lens length, the enlarged available aperture, the telephoto effect, the improved imaging quality, or the improved assembly yield can be provided easier according to the embodiments of the invention to improve the shortcomings of the related art if aforementioned conditions are satisfied.

In addition, the relational expressions are limited in an exemplary sense and can be randomly and selectively combined and applied to the embodiments of the invention in different manners; the invention should not be limited to the above examples. In implementation of the invention, apart from the above-described relational expressions, it is also possible to design additional detailed structures such as lens concave and convex curvatures arrangements for the lens elements so as to enhance control of system property and/or resolution. For instance, a concave portion in a vicinity of the optical axis or a concave portion in a vicinity of a periphery of the lens element may be selectively and additionally formed on the image-side surface of the second lens element. It should be noted that the above-described details can be optionally combined and applied to the other embodiments of the invention under the condition where they are not in conflict with one another.

To sum up, the optical imaging lens 10 described in the embodiments of the invention may have at least one of the following advantages and/or achieve at least one of the following effects.

1. The longitudinal spherical aberrations, the field curvature aberrations, and the distortion aberrations provided in the embodiments of the invention all comply with usage specifications. Moreover, all of the off-axis rays of the three representative wavelengths 650 nm (red light), 555 nm (green light), and 470 nm (blue light) at different heights are concentrated around the imaging point, and it can be observed that, in view of the skew margin of the curve for each wavelength, all of the imaging point deviations of the off-axis rays at different heights are under control and have the capability of suppressing spherical aberrations, image aberrations, and distortion. With further examination upon the imaging quality data, inter-distances between the three representative wavelengths 650 nm, 555 nm, and 470 nm are fairly close, indicating that rays with different wavelengths in the embodiments of the invention can be well concentrated under different circumstances to provide the capability of suppressing dispersion. As such, it can be known from the above that, the embodiments of the invention can provide favorable optical properties.

2. The third lens element 5 has positive refracting power and can effectively converge light together with the concave portion 522 in the vicinity of the optical axis I included by the image-side surface 52 of the third lens element 5.

3. With the design in which the image-side surface 32 of the first lens element 3 has the concave portion 324 in the vicinity of the periphery of the first lens element 3, the fourth lens element 6 has negative refracting power, the object-side surface 61 of the fourth lens element 6 has the concave portion 612 in the vicinity of the optical axis I, and the fifth lens element 7 has negative refracting power, the image difference can be effectively corrected and the favorable system length can be maintained. Moreover, a better configuration can be further provided if the design is the object-side surface 71 of the fifth lens element 7 having the concave portion 712 in the vicinity of the optical axis I and the image-side surface 72 of the fifth lens element 7 having the concave portion 722 in the vicinity of the optical axis I.

4. The first lens element 3, the second lens element 4 and the sixth lens element 8 made of plastic material can effectively reduce costs and can reduce weight.

All of the numerical ranges including the maximum and minimum values and the values therebetween which are obtained from the combining proportion relation of the optical parameters disclosed in each embodiment of the invention are implementable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An optical imaging lens comprising: a first lens element, a second lens element, a third lens element, a fourth lens element, a fifth lens element, and a sixth lens element from an object side to an image side in order along an optical axis, wherein the first lens element to the sixth lens element each comprise an object-side surface facing the object side and allowing imaging rays to pass through and an image-side surface facing the image side and allowing the imaging rays to pass through;

the first lens element being made of plastic material, the image-side surface of the first lens element having a concave portion in a periphery region of the first lens element;

the second lens element being made of plastic material;

the third lens element having positive refracting power, the image-side surface of the third lens element having a concave portion in an optical axis region;

the fourth lens element having negative refracting power, the object-side surface of the fourth lens element having a concave portion in an optical axis region;

the object-side surface of the fifth lens element having a concave portion in an optical axis region, the image-side surface of the fifth lens element having a concave portion in an optical axis region; and the sixth lens element being made of plastic material;

wherein lens elements having refracting power included by the optical imaging lens are only the six lens elements described above, and the optical imaging lens satisfies: GmaxF/GmaxT≤2.5, wherein GmaxF is a first greatest value among five air gaps of the first lens element to the sixth lens element along the optical axis, and GmaxT is a third greatest value among the five air gaps of the first lens element to the sixth lens element along the optical axis.

2. The optical imaging lens according to claim 1, wherein the optical imaging lens further satisfies: T1/T2≤4.5, wherein T1 is a thickness of the first lens element along the optical axis, and T2 is a thickness of the second lens element along the optical axis.

3. The optical imaging lens according to claim 1, wherein the optical imaging lens further satisfies: EFL/TTL≥0.95, wherein EFL is an effective focal length of the optical imaging lens, and TTL is a distance from the object-side surface of the first lens element to an image plane of the optical imaging lens along the optical axis.

4. The optical imaging lens according to claim 1, wherein the optical imaging lens further satisfies: EFL/ALT≥1.6, wherein EFL is an effective focal length of the optical imaging lens, and ALT is a sum of thicknesses of the first lens element, the second lens element, the third lens element, the fourth lens element, the fifth lens element and the sixth lens element along the optical axis.

5. The optical imaging lens according to claim 1, wherein the optical imaging lens further satisfies: ALT/AAG≤2.7, wherein ALT is a sum of thicknesses of the first lens element, the second lens element, the third lens element, the fourth lens element, the fifth lens element and the sixth lens element along the optical axis, and AAG is a sum of the five air gaps of the first lens element to the sixth lens element along the optical axis.

6. The optical imaging lens according to claim 1, wherein the optical imaging lens further satisfies: (G12+G45)/T4≤4.0, wherein G12 is the air gap from the first lens element to the second lens element along the optical axis, G45 is the air gap from the fourth lens element to the fifth lens element along the optical axis, and T4 is a thickness of the fourth lens element along the optical axis.

7. The optical imaging lens according to claim 1, wherein the optical imaging lens further satisfies: T6/(G23+G56)≤5.0, wherein T6 is a thickness of the sixth lens element along the optical axis, G23 is the air gap from the second lens element to the third lens element along the optical axis, and G56 is the air gap from the fifth lens element to the sixth lens element along the optical axis.

8. The optical imaging lens according to claim 1, wherein the optical imaging lens further satisfies: ALT/(G23+

G34)≤5.6, wherein ALT is a sum of thicknesses of the first lens element, the second lens element, the third lens element, the fourth lens element, the fifth lens element and the sixth lens element along the optical axis, G23 is the air gap from the second lens element to the third lens element along the optical axis, and G34 is the air gap from the third lens element to the fourth lens element along the optical axis.

9. The optical imaging lens according to claim 1, wherein the optical imaging lens satisfies: TTL/BFL≤8.0, wherein TTL is a distance from the object-side surface of the first lens element to an image plane of the optical imaging lens along the optical axis, and BFL is a distance from the image-side surface of the sixth lens element to the image plane along the optical axis.

10. The optical imaging lens according to claim 1, wherein the optical imaging lens satisfies: (G34+G45+G56)/(T4+T5)≥2.0, wherein G34 is the air gap from the third lens element to the fourth lens element along the optical axis, G45 is the air gap from the fourth lens element to the fifth lens element along the optical axis, G56 is the air gap from the fifth lens element to the sixth lens element along the optical axis, T4 is a thickness of the fourth lens element along the optical axis, and T5 is a thickness of the fifth lens element along the optical axis.

11. An optical imaging lens comprising: a first lens element, a second lens element, a third lens element, a fourth lens element, a fifth lens element, and a sixth lens element from an object side to an image side in order along an optical axis, wherein the first lens element to the sixth lens element each comprise an object-side surface facing the object side and allowing imaging rays to pass through and an image-side surface facing the image side and allowing the imaging rays to pass through;

the first lens element being made of plastic material, the image-side surface of the first lens element having a concave portion in a periphery region of the first lens element;

the second lens element being made of plastic material;

the third lens element having positive refracting power, the image-side surface of the third lens element having a concave portion in an optical axis region;

the fourth lens element having negative refracting power, the object-side surface of the fourth lens element having a concave portion in an optical axis region;

the fifth lens element having negative refracting power, the object-side surface of the fifth lens element having a concave portion in an optical axis region; and the sixth lens element being made of plastic material;

wherein lens elements having refracting power included by the optical imaging lens are only the six lens elements described above, and the optical imaging lens satisfies: GmaxF/GmaxT≤2.5, wherein GmaxF is a first greatest value among five air gaps of the first lens element to the sixth lens element along the optical axis, and GmaxT is a third greatest value among the five air gaps of the first lens element to the sixth lens element along the optical axis.

12. The optical imaging lens according to claim 11, wherein the optical imaging lens further satisfies: T1/T2≤4.5, wherein T1 is a thickness of the first lens element along the optical axis, and T2 is a thickness of the second lens element along the optical axis.

13. The optical imaging lens according to claim 11, wherein the optical imaging lens further satisfies: EFL/TTL≥0.95, wherein EFL is an effective focal length of the optical imaging lens, and TTL is a distance from the object-side surface of the first lens element to an image plane of the optical imaging lens along the optical axis.

14. The optical imaging lens according to claim 11, wherein the optical imaging lens further satisfies: (T5+T6)/T4≥3.5, wherein T5 is a thickness of the fifth lens element along the optical axis, T6 is a thickness of the sixth lens element along the optical axis, and T4 is a thickness of the fourth lens element along the optical axis.

15. The optical imaging lens according to claim 11, wherein the optical imaging lens further satisfies: (G45+G56)/T2≤6.0, wherein G45 is the air gap from the fourth lens element to the fifth lens element along the optical axis, G56 is the air gap from the fifth lens element to the sixth lens element along the optical axis, and T2 is a thickness of the second lens element along the optical axis.

16. The optical imaging lens according to claim 11, wherein the optical imaging lens further satisfies: EFL/(T3+T4)≥6.9, wherein EFL is an effective focal length of the optical imaging lens, T3 is a thickness of the third lens element along the optical axis, and T4 is a thickness of the fourth lens element along the optical axis.

17. The optical imaging lens according to claim 11, wherein the optical imaging lens further satisfies: AAG/T2≤9.0, wherein AAG is a sum of the five air gaps of the first lens element to the sixth lens element along the optical axis, and T2 is a thickness of the second lens element along the optical axis.

18. The optical imaging lens according to claim 11, wherein the optical imaging lens further satisfies: (G56+T6)/T1≥1.5, wherein G56 is the air gap from the fifth lens element to the sixth lens element along the optical axis, T6 is a thickness of the sixth lens element along the optical axis, and T1 is a thickness of the first lens element along the optical axis.

19. The optical imaging lens according to claim 11, wherein the optical imaging lens further satisfies: (G34+G45)/G56≤5.5, wherein G34 is the air gap from the third lens element to the fourth lens element along the optical axis, G45 is the air gap from the fourth lens element to the fifth lens element along the optical axis, and G56 is the air gap from the fifth lens element to the sixth lens element along the optical axis.

20. The optical imaging lens according to claim 11, wherein the optical imaging lens further satisfies: TTL/(G23+G45)≥6.0, wherein TTL is a distance from the object-side surface of the first lens element to an image plane of the optical imaging lens along the optical axis, G23 is the air gap from the second lens element to the third lens element along the optical axis, and G45 is the air gap from the fourth lens element to the fifth lens element along the optical axis.

* * * * *